United States Patent
Woodman

(10) Patent No.: US 9,324,377 B2
(45) Date of Patent: Apr. 26, 2016

(54) SYSTEMS AND METHODS FOR FACILITATING RENDERING VISUALIZATIONS RELATED TO AUDIO DATA

(75) Inventor: Oliver John Woodman, Chippenham (GB)

(73) Assignee: GOOGLE INC., Mountain View, CA (US)

(*) Notice: Subject to any disclaimer, the term of this patent is extended or adjusted under 35 U.S.C. 154(b) by 497 days.

(21) Appl. No.: 13/435,396

(22) Filed: Mar. 30, 2012

(65) Prior Publication Data

US 2013/0261777 A1  Oct. 3, 2013

(51) Int. Cl.
| | | |
|---|---|---|
| G06F 17/00 | (2006.01) | |
| G11B 27/10 | (2006.01) | |
| G11B 27/32 | (2006.01) | |
| G11B 27/34 | (2006.01) | |
| H04N 21/233 | (2011.01) | |
| H04N 21/258 | (2011.01) | |
| H04N 21/414 | (2011.01) | |
| H04N 21/472 | (2011.01) | |
| H04N 21/6547 | (2011.01) | |
| H04N 21/81 | (2011.01) | |
| H04N 21/84 | (2011.01) | |

(52) U.S. Cl.
CPC ............ *G11B 27/105* (2013.01); *G11B 27/322* (2013.01); *G11B 27/34* (2013.01); *H04N 21/233* (2013.01); *H04N 21/25875* (2013.01); *H04N 21/41407* (2013.01); *H04N 21/47202* (2013.01); *H04N 21/6547* (2013.01); *H04N 21/8113* (2013.01); *H04N 21/84* (2013.01)

(58) Field of Classification Search
CPC .......... G10H 2220/011; G10H 1/0008; G10H 1/368; G10H 2210/031; G10H 2210/076
See application file for complete search history.

(56) References Cited

U.S. PATENT DOCUMENTS

| | | | |
|---|---|---|---|
| 7,461,122 B2 * | 12/2008 | Kawana | 709/203 |
| 7,534,951 B2 | 5/2009 | Yamashita | |
| 7,579,543 B2 | 8/2009 | Haruyama et al. | |
| 2005/0109195 A1 * | 5/2005 | Haruyama et al. | 84/645 |
| 2007/0022867 A1 * | 2/2007 | Yamashita | 84/612 |
| 2008/0026355 A1 * | 1/2008 | Petef | 434/307 A |
| 2009/0056526 A1 | 3/2009 | Yamashita et al. | |
| 2010/0174777 A1 * | 7/2010 | Ijichi | 709/203 |

OTHER PUBLICATIONS

Daniel Emery, "New Utility That Breaks Music Down Into Its Components", BBC News Technology, Feb. 19, 2011, pp. 1-3.

* cited by examiner

*Primary Examiner* — Curtis Kuntz
*Assistant Examiner* — Thomas Maung
(74) *Attorney, Agent, or Firm* — Morris & Kamlay LLP

(57) ABSTRACT

Systems and methods for facilitating rendering a visualization related to audio data are described. One of the methods includes accessing an audio file that is stored within a server computing system. The audio file includes the audio data. The method further includes extracting acoustic profile data from audio data. The extraction of the acoustic profile data is performed within the server computing system. The method also includes associating the acoustic profile data with the audio file and sending the acoustic profile data to a client device for displaying at the client device during playback of the audio file the visualization that is based on the acoustic profile data.

18 Claims, 17 Drawing Sheets

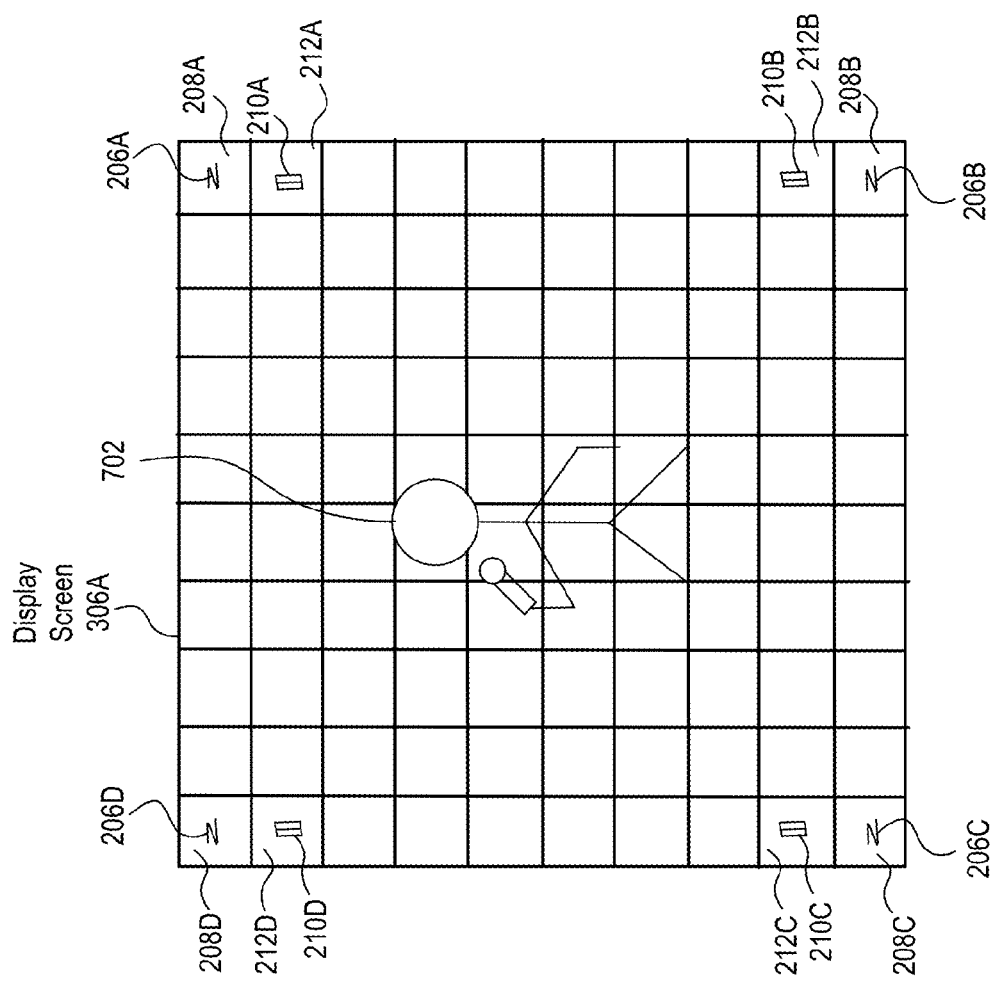

SYSTEMS AND METHODS FOR FACILITATING RENDERING VISUALIZATIONS RELATED TO AUDIO DATA

The present disclosure relates to systems and methods for facilitating rendering visualizations related to audio data.

BACKGROUND

Description of the Related Art

Advancement of networking applications has involved audio playback applications. Various users use audio playback applications to download songs or music from a network, such as the Internet. For example, a user uses his or her smart phone to stream music to the smart phone and play music on the smart phone. The download and the playback are almost instantaneous to allow the user to enjoy music as soon as the music is selected by the user.

There are a variety of applications that are executed in conjunction with the audio playback applications. These other applications should not slow down the download and/or playback of music or song. It is in this context that embodiments arise.

SUMMARY

Various embodiments described in the present disclosure provide systems and methods for facilitating rendering visualizations related to audio data. It should be appreciated that the embodiments described in the present disclosure can be implemented in numerous ways, such as a process, an apparatus, a system, a device or a method on a computer readable medium. Several embodiments are described below.

In some embodiments, acoustic profile data is extracted from an audio file. The extraction is performed within a server computing system that is outside a client device. For example, acoustic profile data is extracted from an audio file after the audio file is uploaded to a server computing system. Such extraction avoids a slowdown in display on the client device of visualization features corresponding to the audio file. Moreover, the extraction allows rendering of visualizations of audio data when a user is streaming music or song from a server computing system or is playing music or song after the music or song is streamed to a client device.

In one embodiment, a method for facilitating rendering a visualization related to audio data is described. The method includes accessing an audio file that is stored within a server computing system. The audio file includes the audio data. The method further includes extracting acoustic profile data from the audio data. The extraction of the acoustic profile data is performed within the server computing system. The method also includes associating the acoustic profile data with the audio file and sending the acoustic profile data to a client device for displaying at the client device during playback of the audio file the visualization that is based on the acoustic profile data.

In some embodiments, a method for rendering visualizations related to audio data is described. The method includes executing a media application, receiving a request at the media application to play the audio data embodied in an audio file, and sending a request via the media application for the audio file to a server computing system in response to receiving the request. The method further includes receiving the audio file and an acoustic profile in response to sending the request and visually rendering one or more features that are described within the acoustic profile with playback of the audio file.

In various embodiments, a server computing system for facilitating rendering a visualization related to audio data is described. The server computing system includes a memory device configured to store an audio file that includes the audio data. The server computing system further includes a processor. The processor is configured to access the audio file from the memory device, extract acoustic profile data from the audio data, and associate the acoustic profile data with the audio data. The server computing system includes an adapter configured to send the acoustic profile data to a client device for displaying at the client device during playback of the audio file the visualization that is based on the acoustic profile data.

In one embodiment, a client device for rendering visualizations related to audio data is described. The client device also includes a processor. The processor is configured to execute a media application, receive a request at the media application to play the audio data embodied in an audio file, and send a request via the media application for the audio file to a server computing system in response to receiving the request. The processor is further configured to receive an acoustic profile and the audio file with the acoustic profile in response to sending the request. The processor is further configured to visually render one or more features expressed within the acoustic profile with playback of the audio file. The client device includes a memory configured to store the audio file.

Other aspects will become apparent from the following detailed description, taken in conjunction with the accompanying drawings.

BRIEF DESCRIPTION OF THE DRAWINGS

Various embodiments described in the present disclosure may best be understood by reference to the following description taken in conjunction with the accompanying drawings.

FIG. 15 is a diagram of an embodiment of the display screen to illustrate a display of various features in conjunction with a display of video data, in accordance with an embodiment described in the present disclosure.

DETAILED DESCRIPTION

The following embodiments describe systems and methods for facilitating rendering visualizations related to audio data.

It will be apparent, that the present embodiments may be practiced without some or all of these specific details. In other instances, well known process operations have not been described in detail in order not to unnecessarily obscure the present embodiments.

Figure 1A:
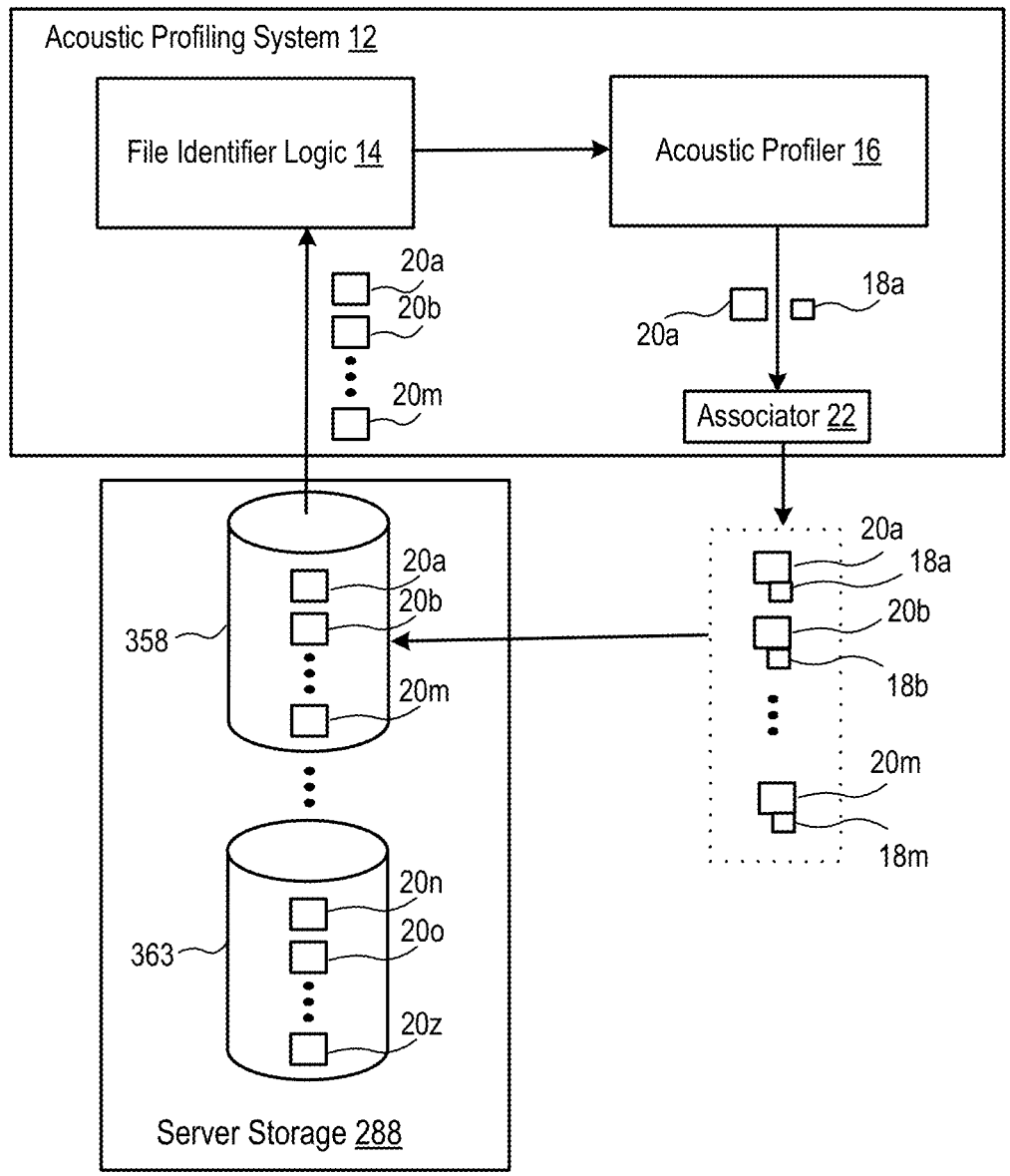
FIG. 1A is a block diagram of an embodiment of an acoustic profiler system (APS) for creating acoustic profile data from an audio file, in accordance with one embodiment described in the present disclosure.

FIG. 1A is a block diagram of an embodiment illustrating use of an acoustic profiler system (APS) 12 for creating acoustic profile data from an audio file. Various audio files 20a thru 20m are stored in a locker storage 358, which is a database. Moreover, various audio files 20n thru 20z are stored in another locker storage 363. The locker storages 358 and 363 are within a server storage (SS) 288. In some embodiments, a server storage includes a cloud storage.

A file identifier logic 14 of the APS 12 accesses the audio file 20a and provides the audio file 20a to an acoustic profiler 16. The acoustic profiler 16 generates acoustic profile data 18a from the audio file 20a in a manner described below. An associator 22 associates the acoustic profile data 18a with the audio file 20a in a manner described below. A combination of the acoustic profile data 18a and the audio file 20a is provided by the associator 22 to the locker storage 358 to store in the locker storage 358. Similarly, various other combinations of the audio files 20b thru 20m with the corresponding acoustic profile data 18b thru 18m is generated and provided for storage to the locker storage 358.

In some embodiments, each locker storage includes audio files and acoustic profile data that are associated with a user, such as user A. For example, locker storage 358 includes audio file and acoustic profile data that are associated with a username and/or a password assigned to the user A and the locker storage 363 includes audio files and acoustic profile data that are associated with a username and/or a password assigned to a user B. In various embodiments, each locker storage includes audio files and acoustic profile data that are associated with multiple users.

In some embodiments, the file identifier logic 14, acoustic profiler 16, and associator 22 are executed by one or more processors or one or more computer processor programs of a node, which is further described below.

Figure 1B:
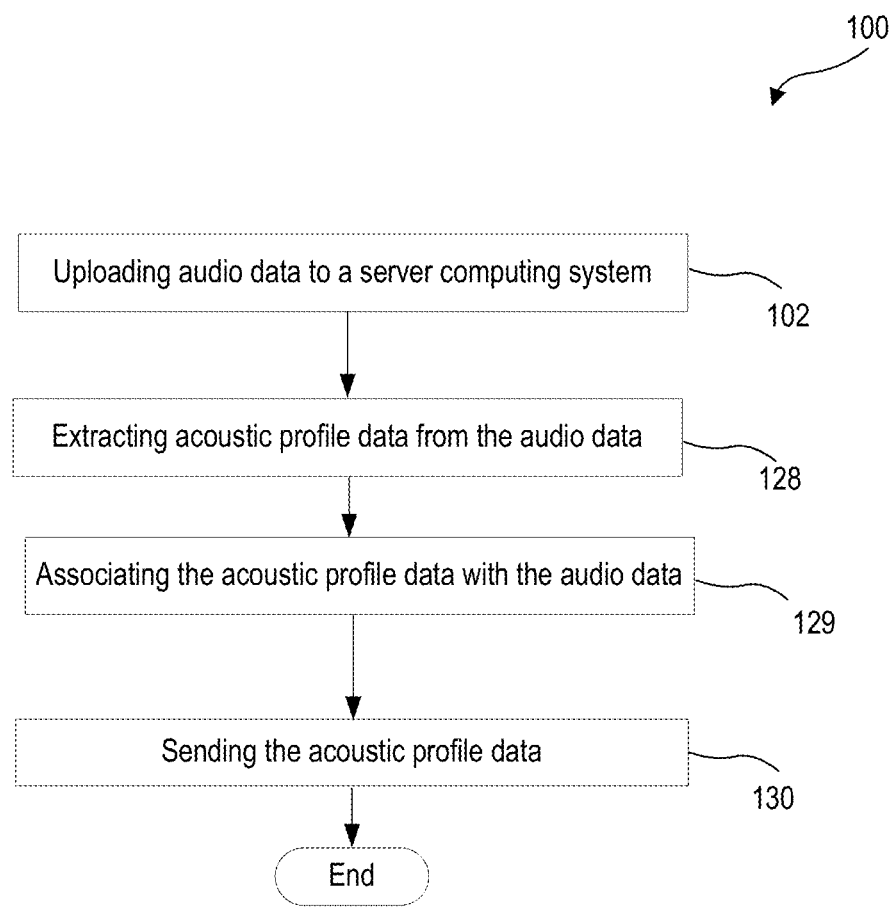
FIG. 1B is a flowchart of a method for extracting acoustic profile data and sending the acoustic profile data to facilitate rendering of visualizations related to audio data, in accordance with one embodiment described in the present disclosure.

FIG. 1B is a flowchart of an embodiment of a method 100 for extracting acoustic profile data and sending the acoustic profile data to facilitate rendering of visualizations related to audio data. In some embodiments, audio data includes pulse code modulation (PCM) audio data. Audio data is in a compressed form or a decompressed form. As an example, audio data includes data describing lyrics and/or data describing musical notes. The method 100 is performed by one or more processors of a node or one or more computer processor programs of a node. In some embodiments, a processor is a central processing unit (CPU), a microprocessor, an application specific integrated circuit (ASIC), or a programmable logic device (PLD). In one embodiment, a processor includes an arithmetic logic unit (ALU), multiple registers, and one or more multiplexers. In various embodiments, a node is a physical machine or a virtual machine (VM). Each machine is a server. If a node is a physical machine, a server includes a processor and if a node is a virtual machine, a server includes a computer processor program that is executed by one or more processors of a server computing system, which is described below. In some embodiments, a server computing system includes a cloud computing system.

When a node is a virtual machine, the virtual machine is emulated by a hypervisor, which is a platform virtualization computer program. The hypervisor is executed by one or more physical machines to create, manage and monitor any number of VMs.

In an operation 102, audio data is uploaded to a server computing system. For example, a node within a server computing system stores audio data within a storage system that is coupled with the node. A storage system is described below.

In some embodiments, the audio data is received by a node of a server computing system with a request for uploading the audio data from another node of the server computing system. In some embodiments, audio data is received to be uploaded by a node in the form of an audio file. An audio file includes a file header and audio data. Various formats of an audio file include a wave audio file format (WAV), an audio interchange file format (AIFF), an AU file format, a motion pictures experts group (MPEG) file format, and a wavepack (WV) file format. Other examples of various formats of an audio file include an uncompressed audio format, a format with lossless compression, and a format with lossy compression.

In some embodiments, a server computing system includes one or more machines. For example, a server computing system includes one or more virtual machines coupled with one or more physical machines via the hypervisor. As another example, a server computing system includes one or more physical machines coupled to each other via a network, such as the Internet or an Intranet, which includes communication equipment, such as, routers, hubs, and repeaters. In some embodiments, a network includes one or more nodes and other communication equipment, such as routers, hubs, and/or repeaters. In various embodiments, a virtual machine includes an operating system (OS) and an application software that runs on top of the OS. Examples of application software include a social network application software and a music playback and storage application software.

As used herein, a storage system is a random access memory (RAM), a read-only memory (ROM), or a combination of RAM and ROM. In one embodiment, a storage system includes a database that allows one or more physical machines to access data from the database. In some embodiments, a storage system includes one or more memory devices, such as flash memory cards, a redundant array of independent disks (RAID), and/or hard disks.

In operation 128, acoustic profile data is extracted from the audio data that is stored within the server computing system. As an example, audio data is converted from a time domain to a frequency domain, amplitudes and frequencies are determined from the audio data, and a combination of the amplitudes and frequencies is generated to extract acoustic profile data from the audio data. Examples of acoustic profile data include one or more amplitudes and/or one or more frequencies. The one or more amplitudes and/or one or more frequencies represent one or more features, such as, a pitch, a tone, a treble, a bass, a lyric, a beats per minute (bpm), a note, a type of instrument, and an identity of an artist.

A first combination of amplitudes and/or frequencies defines a first feature, such as a pitch. A second combination of amplitudes and/or frequencies defines a second feature, such as at tone, and so on. For example, an amplitude defines a pitch and a different amplitude defines a treble. As another example, a first frequency defines a pitch and a different frequency defines a treble. As yet another example, a first set of multiple frequencies defines a pitch and a second set of multiple frequencies define a treble. One or more frequencies within the first set are different than one or more frequencies within the second set. As another example, a first set of multiple amplitudes defines a pitch and a second set of multiple amplitudes defines a treble. One or more amplitudes within the first set of amplitudes are different than one or more amplitudes within the second set of amplitudes.

In some embodiments, acoustic profile data is extracted from audio data during storage of the audio data within a server computing system. In one embodiments, the acoustic profile data is extracted from the audio data after storage of the audio data within the server computing system.

In some embodiments, acoustic profile data is extracted again from audio data when an update is made to the extraction operation 128. For example, in operation 128, acoustic profile data is extracted from audio data and when the update is made to an algorithm of the extraction operation 128, the acoustic profile data is extracted again with use of the updated extraction operation.

In operation 129, the acoustic profile data is associated with audio data from which the acoustic profile data is extracted. For example, the acoustic profile data is appended to an end of audio data. In this example, the acoustic profile data is extracted from the audio data. As another example, an identifier is appended or prepended to acoustic profile data that is extracted from audio data. In this example, the identifier identifies the audio data. As another example, an identifier is appended or prepended to audio data from which acoustic profile data is extracted. In this example, the identifier identifies the acoustic profile data.

In operation 130, the acoustic profile data that is extracted is sent to a client device, such as a computer, a desktop, a laptop, a cell phone, a smart phone, a tablet, or a portable media player. In one embodiment, the acoustic profile data is sent via a network, such as the Internet or an Intranet, to a client device. In various embodiments, the acoustic profile data is sent via a wired network and a wireless network, such as a Wi-Fi network, a 3G network, a 4G network, a network that fulfills international mobile telecommunications-2000 specifications, to a client device. The method 100 then ends.

Figure 2A:
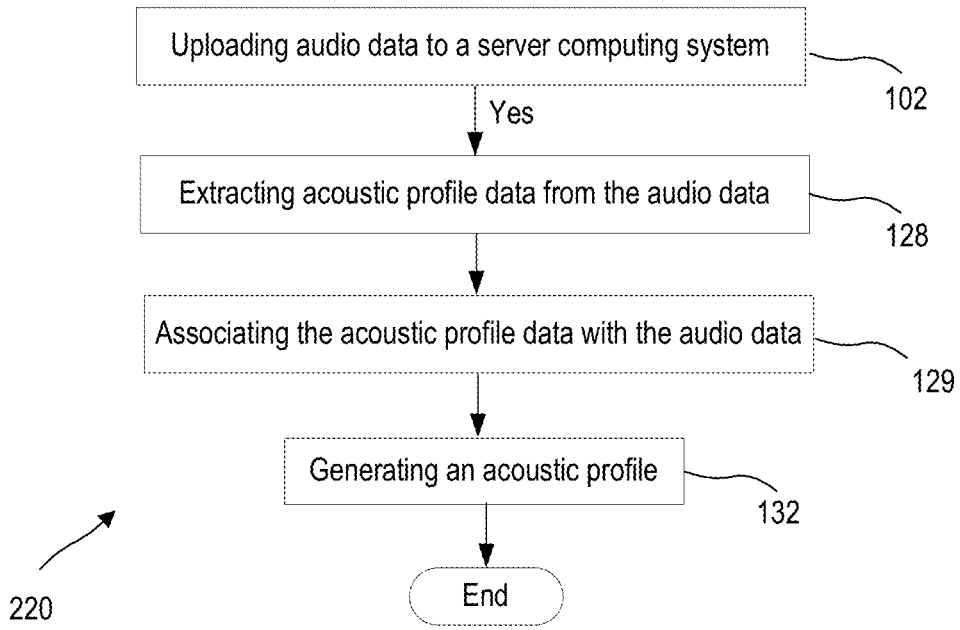
FIG. 2 is a flowchart of a method for extracting acoustic profile data and sending an acoustic profile to facilitate rendering of visualizations related to audio data, in accordance with one embodiment described in the present disclosure.
Figure 2B:
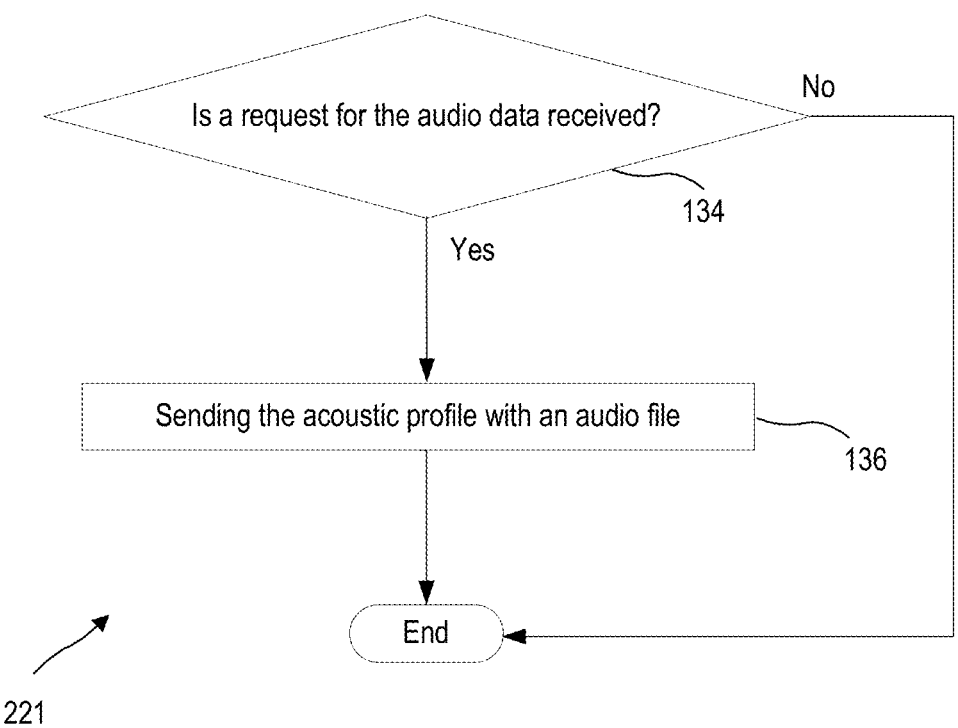

FIG. 2 is a flowchart of an embodiment of a method 220 for extracting acoustic profile data and sending an acoustic profile to facilitate rendering of visualizations related to audio data. The method 220 is performed by one or more processors of a node or one or more computer processor programs of a node. In the method 200, operations 102, 128 and 129 are performed. Moreover, in the method 220, in operation 132, an acoustic profile is generated from the acoustic profile data. For example, a file header is attached to the acoustic profile data to generate an acoustic profile, which is a file. Examples of the file header of an acoustic profile include a start bit or byte indicating a start of the acoustic profile, a checksum of the acoustic profile data, a size, such as a number of bytes or a number of bits, of the acoustic profile data, a number of channels consumed by the acoustic profile data, an offset of the acoustic profile data from a start of the acoustic profile, and/or optional text that describes the acoustic profile data. The acoustic profile also includes the acoustic profile data within the body of the acoustic profile. The acoustic profile data is appended to a file header of the acoustic profile.

In one embodiment, an acoustic profile includes one or more channels. For example, an acoustic profile includes a first channel that includes an amplitude A1 of audio data and/or a frequency F1 of audio data. In this example, the acoustic profile includes a second channel that includes an amplitude A2 of the audio data and/or a frequency F2 of the audio data.

In operation 134, it is determined whether a request for audio data is received from a client device. Upon determining that a request for the audio data is not received, the method 220 ends. On the other hand, in response to determining that the request for the audio data is received, in operation 136, the acoustic profile generated in operation 132 is sent with an audio file that includes the audio data. The acoustic profile data of the acoustic profile is associated with the audio data. For example, an acoustic profile is sent via a network to a client device instantaneously with or in real time with an audio file that is associated with the acoustic profile. An audio file is associated with an acoustic profile when the audio file includes audio data that is associated with acoustic profile data of the acoustic profile. As another example, an acoustic profile is sent via a network to a client device simultaneously with an audio file that is associated with the acoustic profile. As another example, an acoustic profile is sent within a time window before or after sending an audio file. In one embodiment, an acoustic profile is compressed before sending the acoustic profile to a client device via a network.

In some embodiments, the audio data and acoustic profile data that is associated with the audio data or the audio data and the acoustic profile that includes the audio profile data is streamed from a server computing system in response to a request for a music or song embodied, such as expressed, in the audio data. For example, the music or song is played back on a client device and features embodied in the acoustic profile data that is associated with audio data that embodies the music or song is rendered on a display device of the client device. In this example, the acoustic profile data is rendered instantaneously with or simultaneously with or in real time with delivery of the audio data and acoustic profile data from a server computing system to the client device. Examples of a display device include a cathode ray tube (CRT) display device, a light emitting diode (LED) display device, a liquid crystal display (LCD) device, and a plasma display device. It should be noted that music excludes any lyrics and a song is sung with or without music. The method 220 ends after operation 136.

Figure 3:
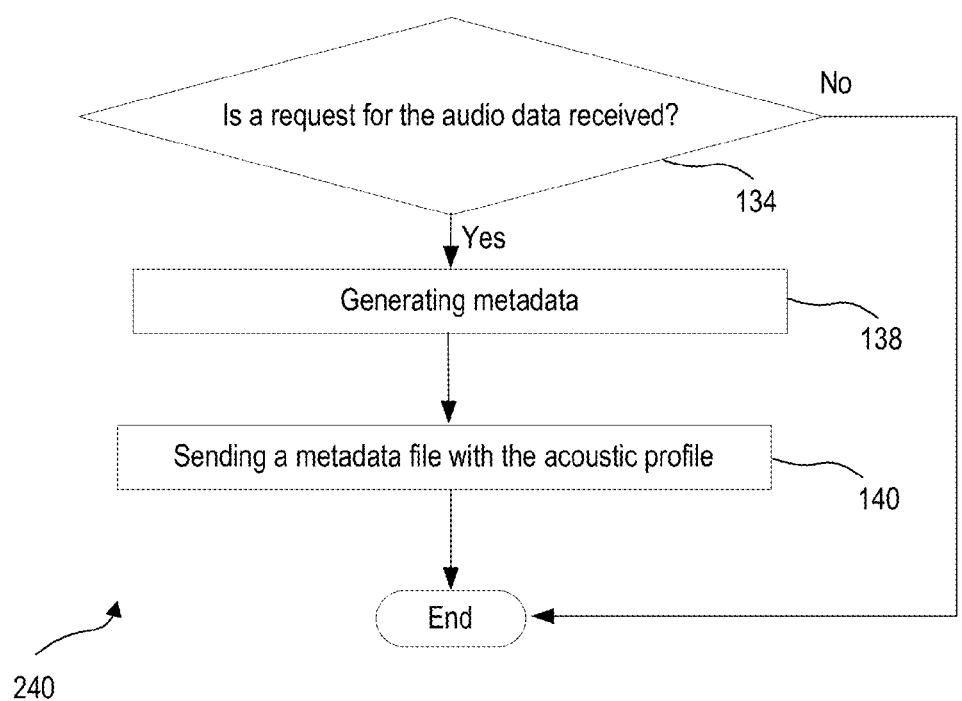
FIG. 3 is a flowchart of a method for extracting acoustic profile data and sending a metadata file with an acoustic profile, in accordance with an embodiment described in the present disclosure.

FIG. 3 is a flowchart of an embodiment of a method 240 for extracting acoustic profile data and sending a metadata file with an acoustic profile. The method 240 is executed by one or more processors of a node or one or more computer processor programs of a node. In the method 240, operations 102, 128, 129, 132, and 134 are performed. Moreover, in response to determining that a request for audio data is received, in operation 138, metadata is generated from the audio data. For example, metadata generated from audio data provides concise information regarding the audio data, such as, a title of a song or music, at least a portion of which is embodied in the audio data.

Other examples of metadata generated from audio data includes text describing at least a portion of the audio data, a duration of playback of the audio data, a genre of a song and/or music, at least a portion of which is embodied in the audio data, an artist of the song and/or music, an album that includes the song and/or music, a year in which the song and/or music was released to the public, and a track number of the song and/or music in the album. In some embodiments, an artist of a song is a singer of the song. In various embodiments, an artist of music is a player of a musical instrument.

A metadata file is created from the metadata in a similar manner in which an acoustic profile is created from acoustic profile data. For example, a metadata file includes a file header and a body. The body of a metadata file includes metadata. A file header of a metadata file includes a start bit or byte indicating a start of the metadata file, a checksum of the metadata, a size, such as a number of bytes or a number of bits, of the metadata, an offset of the metadata from a start of the metadata file, and/or optional text that describes the metadata.

In operation 140, a metadata file including metadata that is generated in operation 138 is sent with an acoustic profile that is generated in operation 132. For example, an acoustic profile is sent via a network to a client device instantaneously with or in real time with a metadata file that is associated with the acoustic profile. As another example, an acoustic profile is sent via a network to a client device simultaneously with a metadata file that is associated with the acoustic profile. As another example, an acoustic profile is sent within a time period before or after sending a metadata file. An acoustic profile is associated with a metadata file when acoustic profile data of the acoustic profile is generated from audio data that is associated with the acoustic profile data and when metadata within the metadata file is generated from the audio data. In one embodiment, a metadata file is compressed before sending the metadata file to a client device via a network. The method 240 ends after operation 140.

Figure 4:
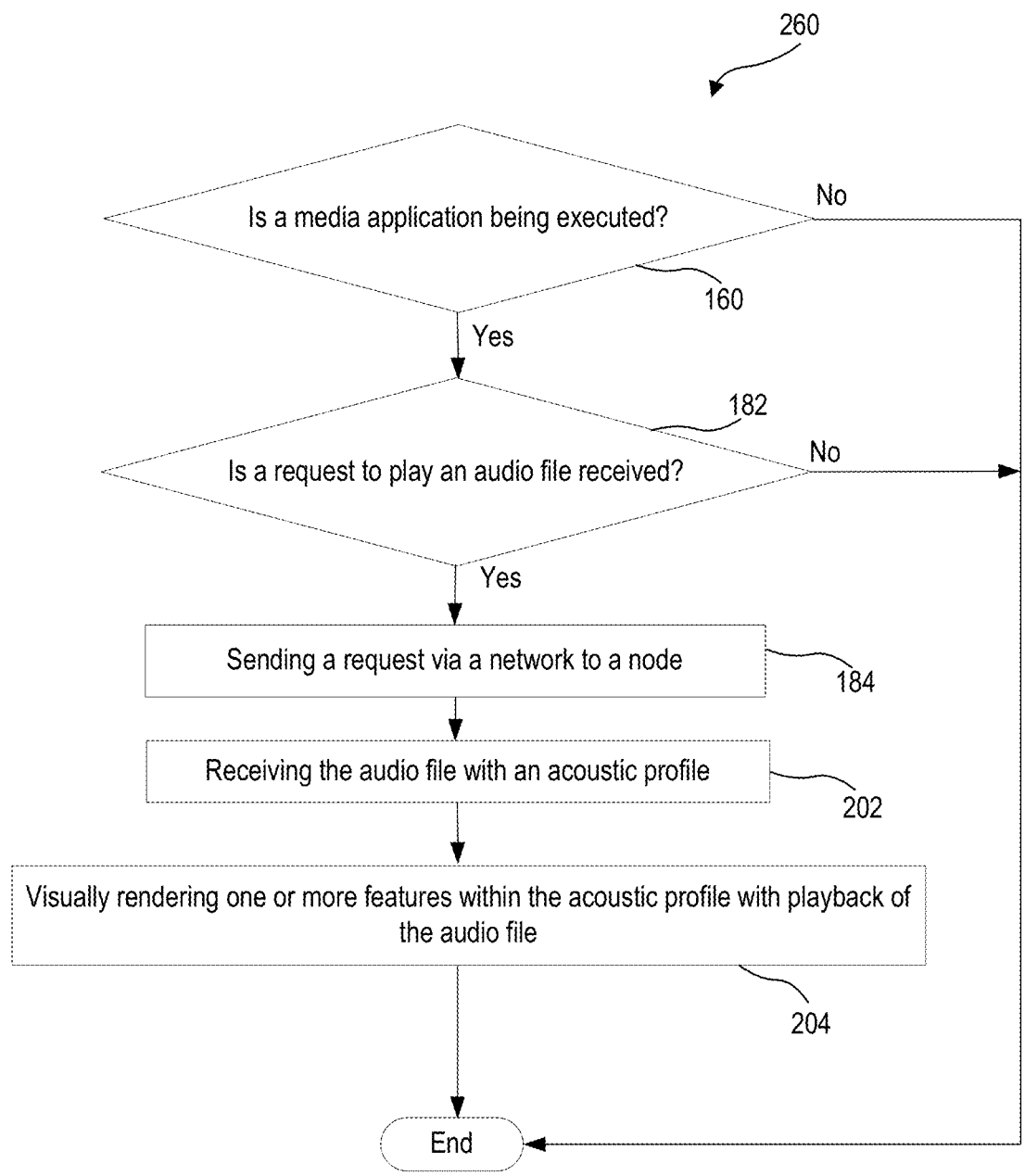
FIG. 4 is a flowchart of a method for receiving a request to play an audio file and rendering visualizations of one or more features within an acoustic profile, in accordance with an embodiment described in the present disclosure.

FIG. 4 is a flowchart of an embodiment of a method 260 for receiving a request to play an audio file and rendering visualizations of one or more features within an acoustic profile. The method 260 is executed by one or more processors of a client device. In an operation 160, it is determined whether a web media application is being executed. An example of a web media application includes a web application that is coded in a browser-supported language. Another example of a web media application includes a web application that allows a user to communicate with the Internet, such as, for example, to access web pages. The web media application is executed on various client devices, such as a computer, a cell phone, and a tablet. In response to determining that a media application is not being executed, the method 260 ends.

On the other hand, upon determining that the media application is being executed, in operation 182, it is determined whether a request to play an audio file is received from a user via an input device, which is described below. For example, a user accesses software music playback and storage application to select a song or music that the wishes to listen. In response to determining that a request to play an audio file is not received, the method 260 ends.

On the other hand, upon determining that a request to play an audio file is received, in operation 184, a request for the audio file is sent to a node of a server computing system via a network. In response to sending a request for the audio file, in operation 202, the audio file is received from a node of a server computing system. Moreover, in operation 202, in response to sending a request for an audio file, an acoustic profile associated with the audio file is received. For example, an audio file and an acoustic profile associated with the audio file are received instantaneously or in real time. As another example, an audio file and an acoustic profile associated with the audio file are received simultaneously. As another example, an acoustic profile is received within a time period before or after an audio file associated with the acoustic profile is received.

In some embodiments, no separate request is made by one or more processors of a client device to receive an acoustic profile associated with the audio file. For example, an acoustic profile is received upon making a request for an audio file without a need to request the acoustic profile. The acoustic profile and the audio file are stored in a cache memory and/or persistent storage within a client device. The cache memory has a lower amount of storage capacity than a persistent storage. Further description of a cache memory and a persistent storage is provided below. In one embodiment, files within a cache memory are deleted periodically by one or more processors of a client device.

In operation 204, visualizations of one or more features embodied within an acoustic profile that is received at operation 202 are rendered with playback of an audio file that is received in operation 202. For example, a first visualization of a first feature is displayed on a display screen of a client device in real time or simultaneously with or instantaneous with the playback of an audio file that is associated with the first feature. In this example, a second visualization is displayed on the display screen in real time with or simultaneously with or instantaneous with the playback of the audio file that is also associated with a second feature. Examples of a display screen include a CRT display screen, an LED display screen, an LCD screen, and a plasma display screen. In some embodiments, visualizations of any number of features are displayed on a display screen of a client device in real time with or simultaneously with or instantaneous with the playback of an audio file associated with the features. The method 260 ends after operation 204.

Figure 5:
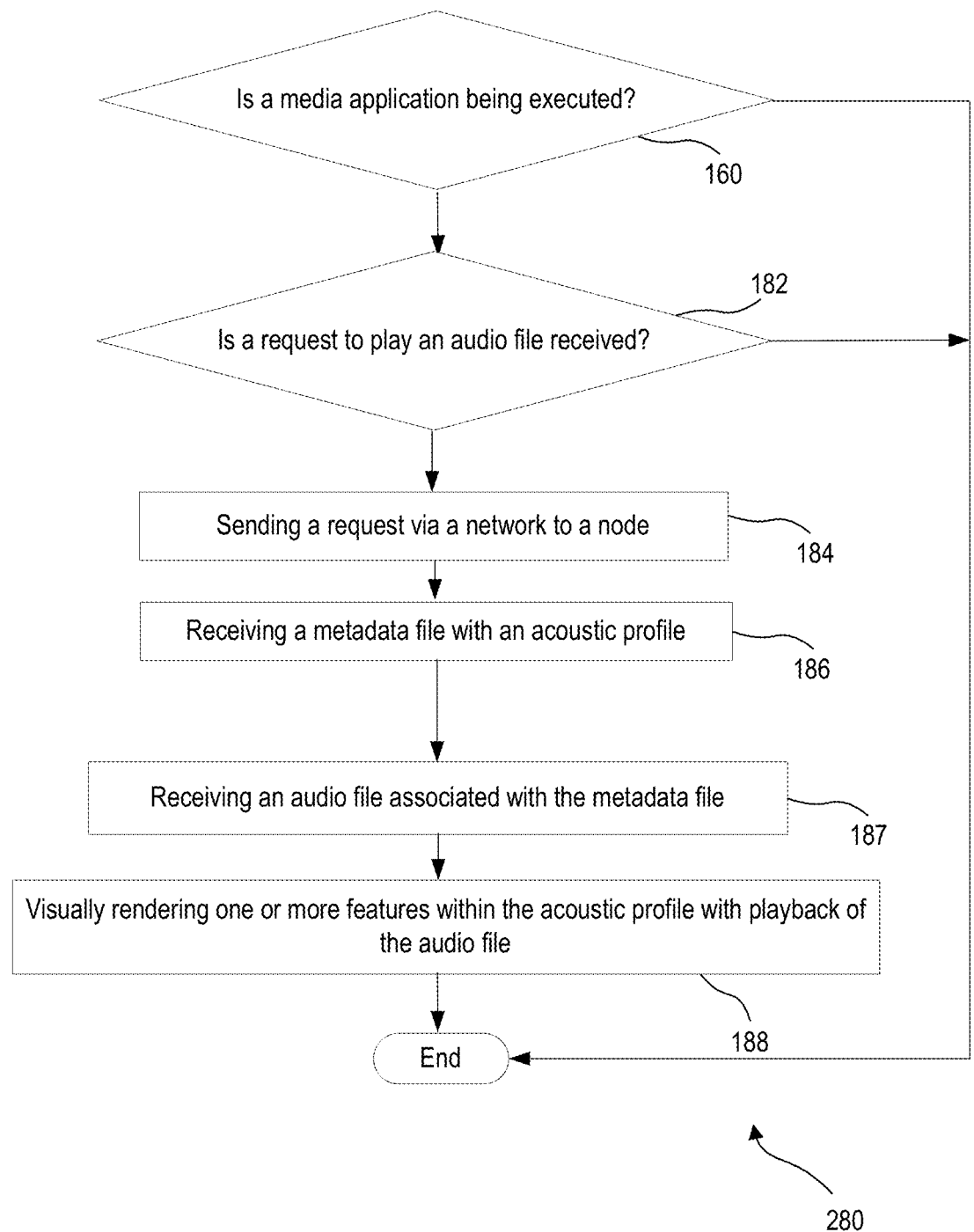
FIG. 5 is a flowchart of an embodiment of another method for receiving a request to play an audio file and rendering visualizations of one or more features within an acoustic profile, in accordance with an embodiment described in the present disclosure.

FIG. 5 is a flowchart of an embodiment of another method 280 for receiving a request to play an audio file and rendering visualizations of one or more features within an acoustic profile. In the method 280, the operations 160, 182 and 184 are performed. Moreover, in operation 186, instead of an audio file that includes audio data embodying at least a portion of a song or music that is requested by a user to be played, a metadata file associated with the audio file is received. Moreover, in operation 186, an acoustic profile associated with the metadata file received in operation 186 is received. For example, an audio file and a metadata file associated with the audio file are received in real time or instantaneously or simultaneously. As another example, an acoustic profile is received within a time window before or after a metadata file associated with the acoustic profile is received. A metadata file is associated with an audio file when metadata within the metadata file is generated from audio data within the audio file.

Moreover, in operation 186, the audio file is received after the metadata file and/or acoustic profile are received. In operation 188, visualizations of one or more features embodied within an acoustic profile that is received at operation 186 are visually rendered with, such as in real time or instantaneously or simultaneously, playback of an audio file that is received in operation 187. The method 280 ends after operation 188.

Figure 6:
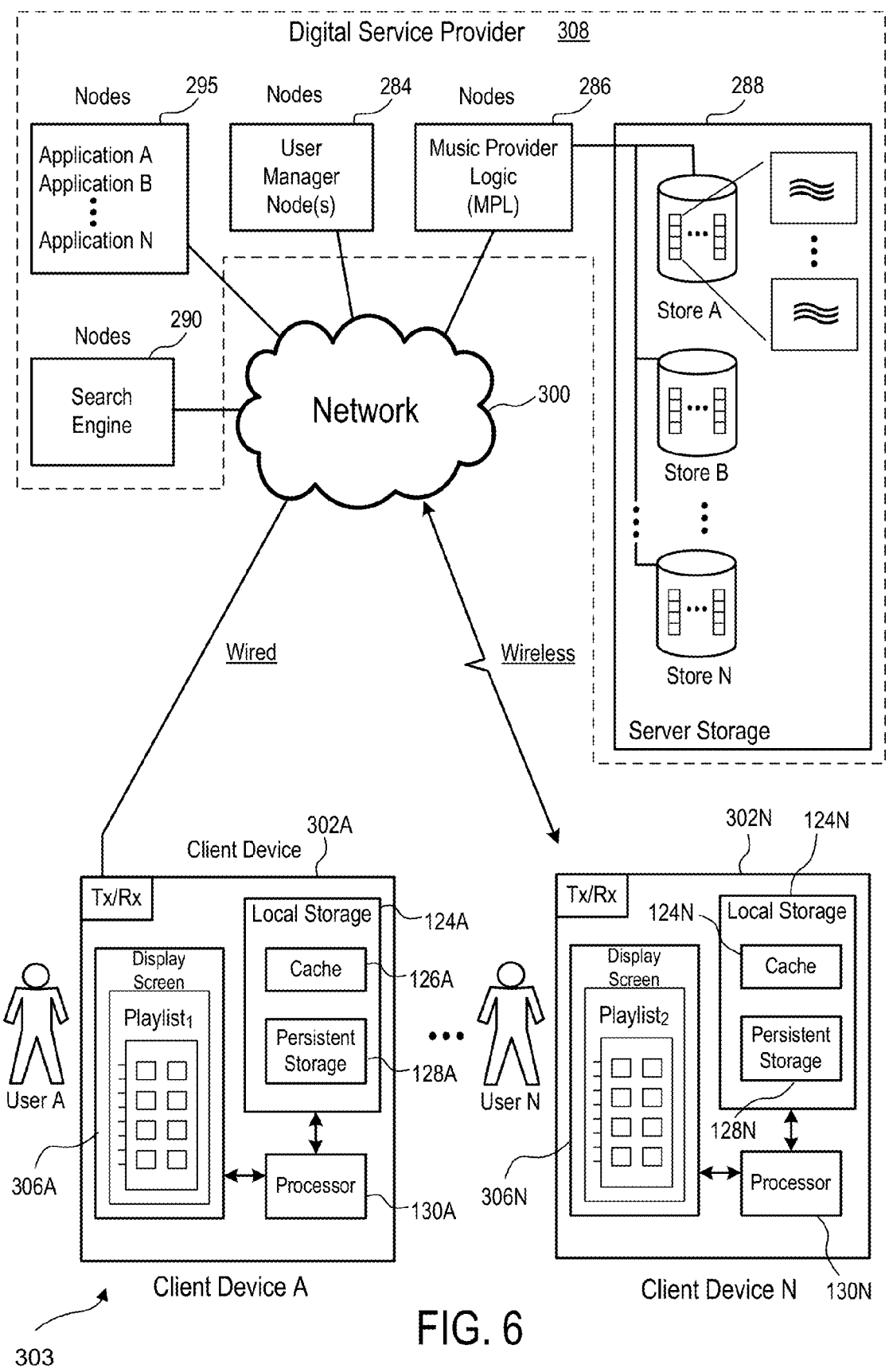
FIG. 6 is a block diagram of a system that defines methods for accessing and playing music files stored in a server storage in response to user selection, in accordance with an embodiment described in the present disclosure.

FIG. 6 is a block diagram of an embodiment of a system 303 that defines methods for accessing and playing music files stored in server storage in response to a user selection. The system 303 includes a plurality of nodes that are connected to a network 300, such as the Internet or an Intranet. The plurality of nodes and storage are, in one embodiment, part of a digital service provider 308. The digital service provider 308 is a system that can include a plurality of servers that can provide applications, services, digital content, and interconnectivity between systems, applications, users, and social networks. For example, the digital service provider 308 can include nodes that provide a search engine 290, nodes that provide a plurality of applications 295 for various business, social, and technology related subject matter, nodes that provide user management 284, and nodes that provide music related services. Examples of applications 295 include an email application, a maps application, a media application, a social network application, and a music playback and storage application.

In some embodiments, an email application is executed to allow a user to send and/or receive electronic mails from other users via a website. In one embodiment, multimedia is embedded within an email. Examples of multimedia include an image, a video, an audio, and text.

Also, in one embodiment, a maps application is executed to provide access to a user to directions from a start address to a destination address, a satellite view of a geographical area, and/or to places of interest to a user.

In various embodiments, a media application is executed to allow a user to access a network, such as the Internet, an Intranet, or a combination thereof.

In several embodiments, a social network application is executed to provide features via a media application to allow users to stay in touch with each other. For example a social network service provides a website for a user to post multimedia, receive multimedia from another user, search for other users, chat with users, and/or categorize users as family, friends, acquaintances, etc.

In some embodiments, a music playback and storage application allows a user to upload one or more audio files to one or more servers, download the one or more audio files, and/or playback the one or more audio files.

One example of digital service provider 308 is an entity that provides web searching services. Other digital service providers can be more focused to provide services, while others provide a variety of services for access, download, viewing, searching, etc. The content can vary greatly, but is commonly presented in digital format and displayed on monitors or screens of devices, computers, smart phones, tablets, etc.

The nodes that provide music related services, in one embodiment, are illustrated by the music provider logic (MPL) 286, that is executed by one or more nodes that are connected to the network 300. The music provider logic 356 is shown connected to server storage 288. Server storage 288 is shown to include a plurality of storage systems, identified as store A, store B, and store N. The various storage systems that hold music data and music metadata, are provided with fast access to the network 300, for providing music data on demand to users requiring access to their music library stored in server storage 288. In one embodiment, users can access the server storage 288 by way of multiple client devices 302. The multiple client devices 302 can include any type of device having a processor and memory, wired or wireless, portable or not portable. In the example illustrated in FIG. 6, user A is shown to have client device 302A (client device A). Client device 302A is shown to include communication logic for transmitting and receiving data between client device 302A and the network 300.

The communication logic (Tx/Rx) can include various types of network interface circuitry, radio-communication (e.g. wireless), cell tower communication, or interconnected wiring connected to Internet service providers. Client device 302A is also shown to include a display device having a screen 306A, local storage 124A, and a processor 130A. Local storage 124A can include a cache memory 126A, a persistent storage 128A, and other logic. Examples of a persistent storage include a random access memory (RAM) or a combination of the RAM and a read-only memory (ROM). In this example, client device 302A is shown to include graphical icons (e.g., graphical user interfaces GUIs) that represent a play list. The screen 306A can be a touch-screen, or a display typically provided by a flat-panel display, a CRT, or other media capable of rendering a display. Still further, client device 302A can have its display separate from the client device 302A, similar to a desktop computer or a laptop computer. Still further yet, client device 302A can be in the form of a smart phone, a tablet computer, or hybrids that provide touch-screen capability in a portable form factor. One example client device 302A can include a portable phone device that runs an operating system and is provided with access to various applications (apps) that may be obtained over the network 300, and executed on the client device 302A.

In one embodiment, the user A of client device 302A can install an application that provides server storage of music files, and access the storage server music files from the client device 302A. Once the user A's music files are uploaded to the server storage 288, the user A's music files are associated to a library of the user A. In one embodiment, a plurality of users A thru N can access the same application and can upload their own music files to create their own library, which will be stored in the server storage 288.

Each of such users A thru N can then access the server storage 288 through an application on his or her client device 302A thru N to render and play selected music files on his or her client device 302A thru N, when the client device has access to the network 300 and to associated servers of the music provider logic 286 and server storage 288. Accordingly, users A thru N can access a music application, which is the application A, on his or her client device 302A thru 302N to access all music files stored in server storage 288, arrange music titles in his or her music library into playlists, add music to the server storage 288, delete music from the server storage 288, and purchase music that is added to the server storage 288. These changes are maintained and managed by the music provider logic 286 and music provider logic 286 will provide access to the various users A thru N to his or her music files stored in the server storage 288, based on their selections during use of the application.

Figure 7:
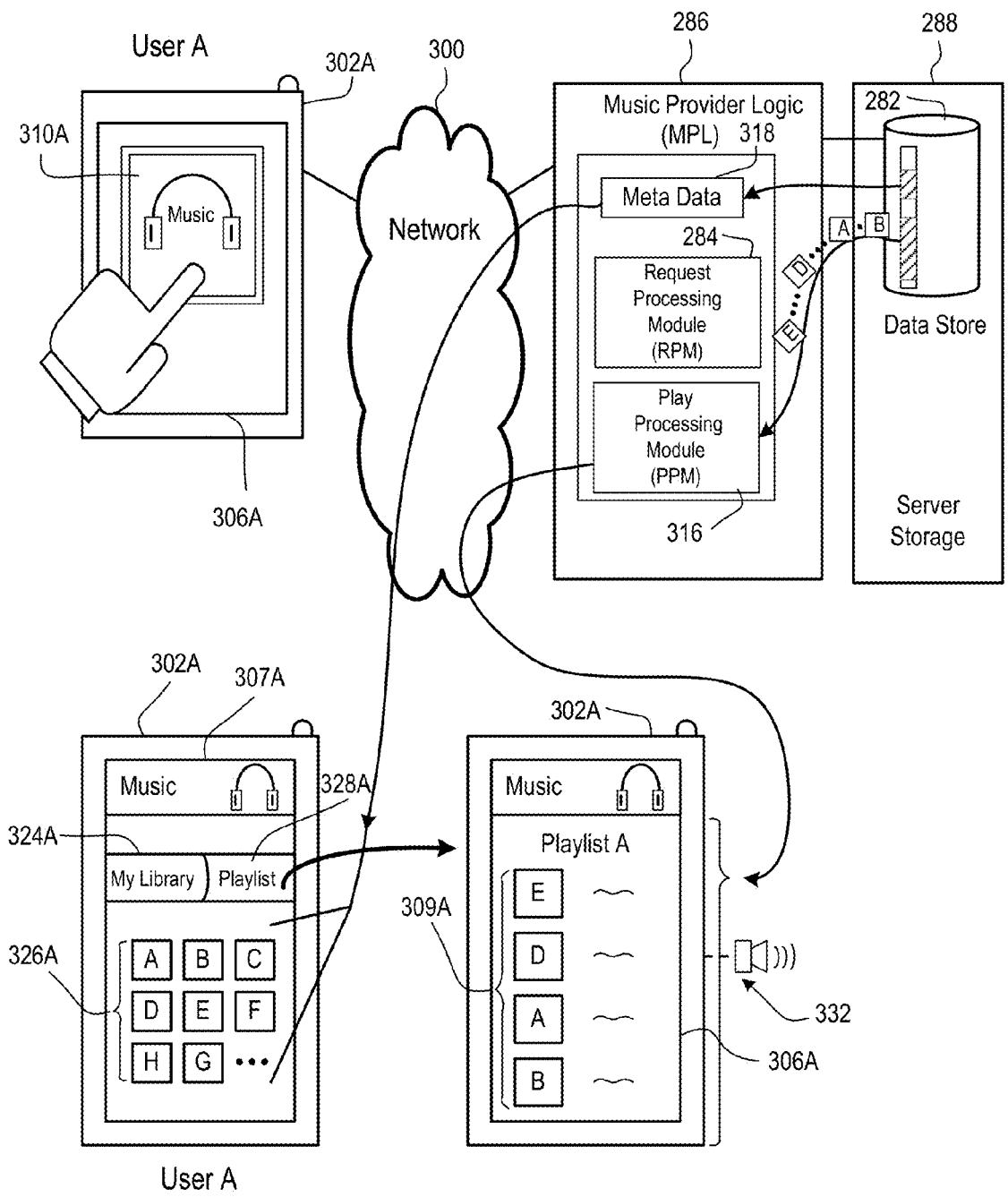
FIG. 7 illustrates how a user utilizes a client device to access his or her music library stored in the server storage, in accordance with one embodiment described in the present disclosure.

FIG. 7 illustrates how user A utilizes the client device 302A (e.g. smart phone) to access his or her music library stored in the server storage 288, in accordance with one embodiment described in the present disclosure. As shown, the device 302A includes the display screen 306A, and associated graphical icons that present a thumbnail of the music application. Execution of the music application provides the user A with access to his or her music library which has been previously added to the server storage 288. If the user A is a new user to the application A, the new user can download application A to device 302A from at least one of nodes of the digital service provider 308.

Once the application A has been downloaded and installed on client device 302A, an icon 310A representing application A will be rendered on the display screen 306A. Initially, the user A will be prompted to select music to add to the server storage 288. The music may be added from files currently maintained by the user A on his or her client device 302A, on other devices of the user A such as computers, other smart phone and or tablets, or other storage media. Additionally, the user A can add music files that may be part of a music library maintained by another application. The other application may maintain a specific format for the music, and the music can be obtained and translated to standardize music files for addition to the server storage 288.

Once the user A has managed his or her library to add, modify, or adjust the music files present in the server storage 288, the user A accesses the application A and various options from graphical user interfaces provided on the screen 306A. In the illustrated example, client device 302A will open application A through various graphical user interface screens, such as interface 307A. Interface 307A can include various menus, selection icons, configuration icons, displays, advertisements, buttons, listings, etc. In this example, the interface 307A may include an icon that lists the user A's library 324A, the user A's play list 328A, and music title icons 326A. Music title icons 326A can be represented by graphical artwork that represents artwork associated with the various music files present in the user A's library 324A. The user A's library 324A is illustrated by music title icons 326A, shown as A-H.

The music title icons 326A and library 324A are rendered on the display screen 310A upon obtaining metadata from the server storage 288, which may be present in data store 282. Music provider logic 286 includes a request processing module 284 that manages the requests and communication between various user applications A thru N and the server storage 288. The request processing module (RPM) 284 is also in communication with a play processing module (PPM) 316. In order to render the music title icons 326A on the display screen 306A, the music provider logic 318 utilizes the request processing module 284 to obtain metadata 318 from the data store 282.

The metadata 318 includes metadata associated with the various music files stored in data store 282 for the requesting user A. The metadata 318 provides information regarding each of the titles stored in the server storage 288, and sufficient information to render the music title icons 326A on the display screen 306A, and provide text information, duration information, genre information, and other data that describes aspects or characteristics of the music files. One example of metadata is an ID3 tag, which can contain information such as title, artist, album, year, track number, genre, etc. As shown, when the user selects play list 328A on the display screen 306A, a play list graphical user interface 309A is shown identifying particular songs that have been arranged by the user.

The playlist A represents various songs that were selected by the user A to be part of playlist A. The user A can have various playlists, and the selection of playlist A is only provided as one example of a playlist that includes music files that are played in the order EDAB. Once the user A selects a corresponding play button or clicks on one of the music files in the playlist A, the music files will begin to play in the order arranged and defined by the user A in his or her playlist A.

Figure 8:
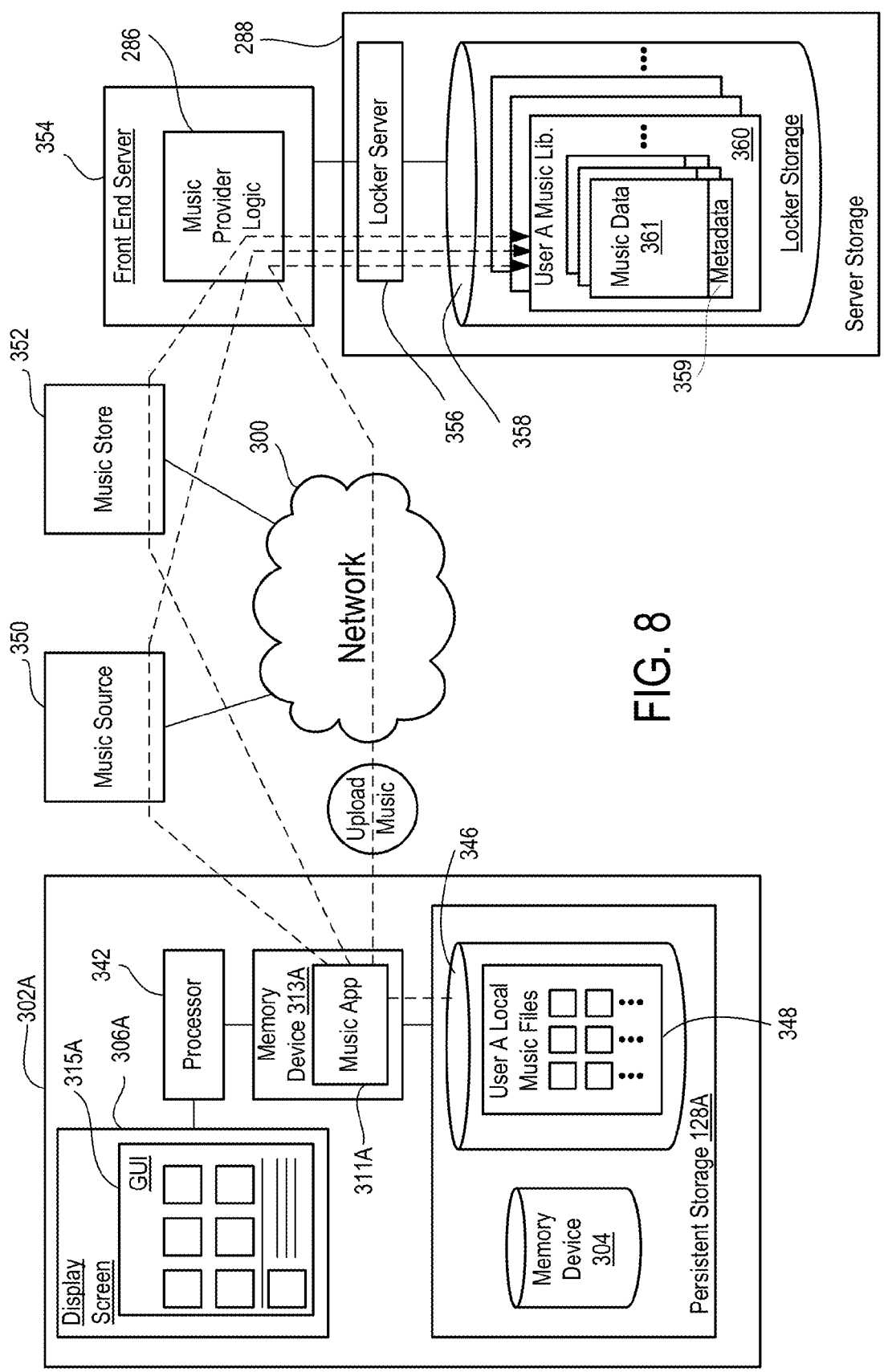
FIG. 8 illustrates how a user uploads music to his or her server-based music library, in accordance with an embodiment described in the present disclosure.

FIG. 8 illustrates how a user A may upload music to their server-based music library, in accordance with an embodiment described in the present disclosure. In some embodiments, a server-based library includes a cloud based library. As shown, a music application 311A is executed in a memory device 313A of the client device 302A. The persistent storage 128A contains a general storage, such as memory device 304, and a local music storage 346. The local music storage 346 includes various music files 348 which the user A has stored on the client device 302A. The music application 311A provides an interface 315A shown on the display screen 306A. The interface 315A enables the user A to manually or automatically upload one or more of the music files 348 to the user's music library 360.

In one embodiment, the music application 311A detects the music files 348 and communicates with the music provider logic 286 via the network 300. The music provider logic 286 executes on a front end server 354. The music provider logic 286 communicates with a locker server 356 which manages access to the locker storage 358. The locker storage 358 contains various users' individual music libraries, including user A's music library 360. The music library 360 includes various music files, each of which is defined by music data 361 and associated metadata 359. Thus, in one embodiment, the music application 311A transmits one or more of the locally stored music files 348 to the music provider logic 318 which accesses the locker storage 358 to store the music files within the user's music library 360.

It will be noted that music files from various other sources may also be uploaded to the user's music library 360. For example, music files from an external music source 350 that is available via the network 300 can be uploaded to the user's music library 360. In one embodiment, the music application 311A enables the user A to access, listen to, and authorize uploading of a music file from a music store 352, which is an external music source. The user A may purchase music from the music store 352 for downloading to the user's music library 360. It will be appreciated that in the illustrated embodiment, by purchasing music from the music store 352, the user A causes a music file to be transferred from the music store 352 to the user A's music library 360. This is distinguished from a conventional online purchase where data is transferred to the user's client device. In the presently described embodiment, the data is transferred to a server-based storage library, which the user then accesses utilizing the client device 302A.

Figure 9:
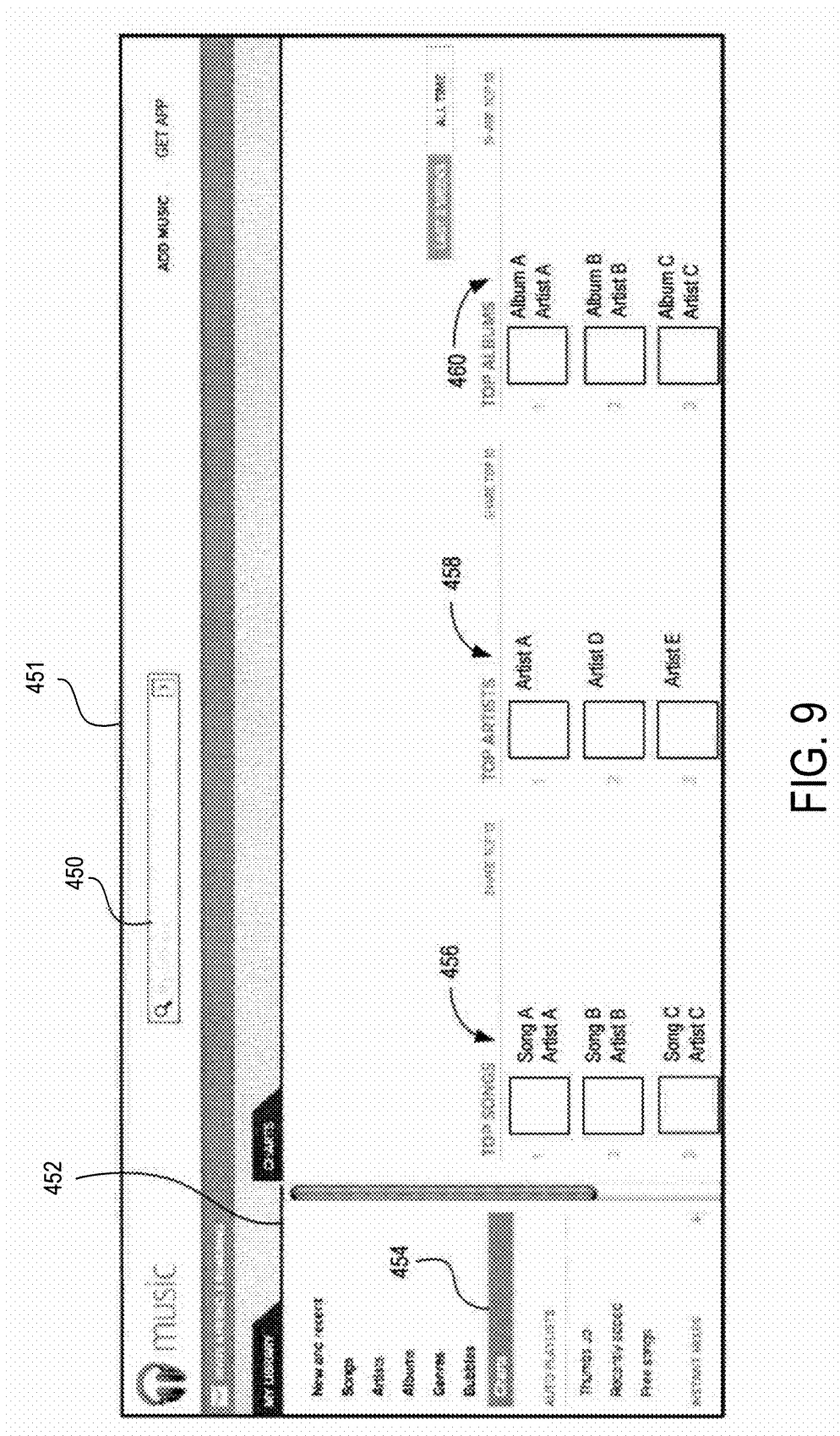
FIG. 9 illustrates an interface for accessing a music library, in accordance with an embodiment described in the present disclosure.

FIG. 9 illustrates an interface 451 for accessing a music library, in accordance with an embodiment described in the present disclosure. The interface 451 includes a search bar 450 for enabling the user A to search his or her music library based on entered key words. The interface 451 is displayed on display screen 306A (FIG. 8). The interface 451 also includes a menu panel 452, from which the user A may choose different views of the library. For example, if the user A selects an "Artists" category from the menu panel 452, the artists in the user's library are displayed, from which the user A may select a particular artist to view songs and/or albums associated with that artist; whereas if the user A selects "Genres" from the menu panel 452, then the various genres within the user A's music library are shown, from which the user A may select a particular genre to view songs within that genre. In the illustrated embodiment, the user has selected "Charts" from the menu panel 452, and thus various charts are shown in the interface 451. For example, a top songs chart 456, a top artists chart 458, and a top albums chart 460 are displayed.

It should be noted that although FIGS. 6-9 are described in terms of music, in several embodiments, the embodiments of FIGS. 6-9 are equally applicable to songs that are played with or without music. While presently described embodiments have generally be described with reference to music files and to a music library, it will be appreciated that the principles described herein apply equally to any type of audio file having associated metadata or any kind of audio library.

Figure 10:
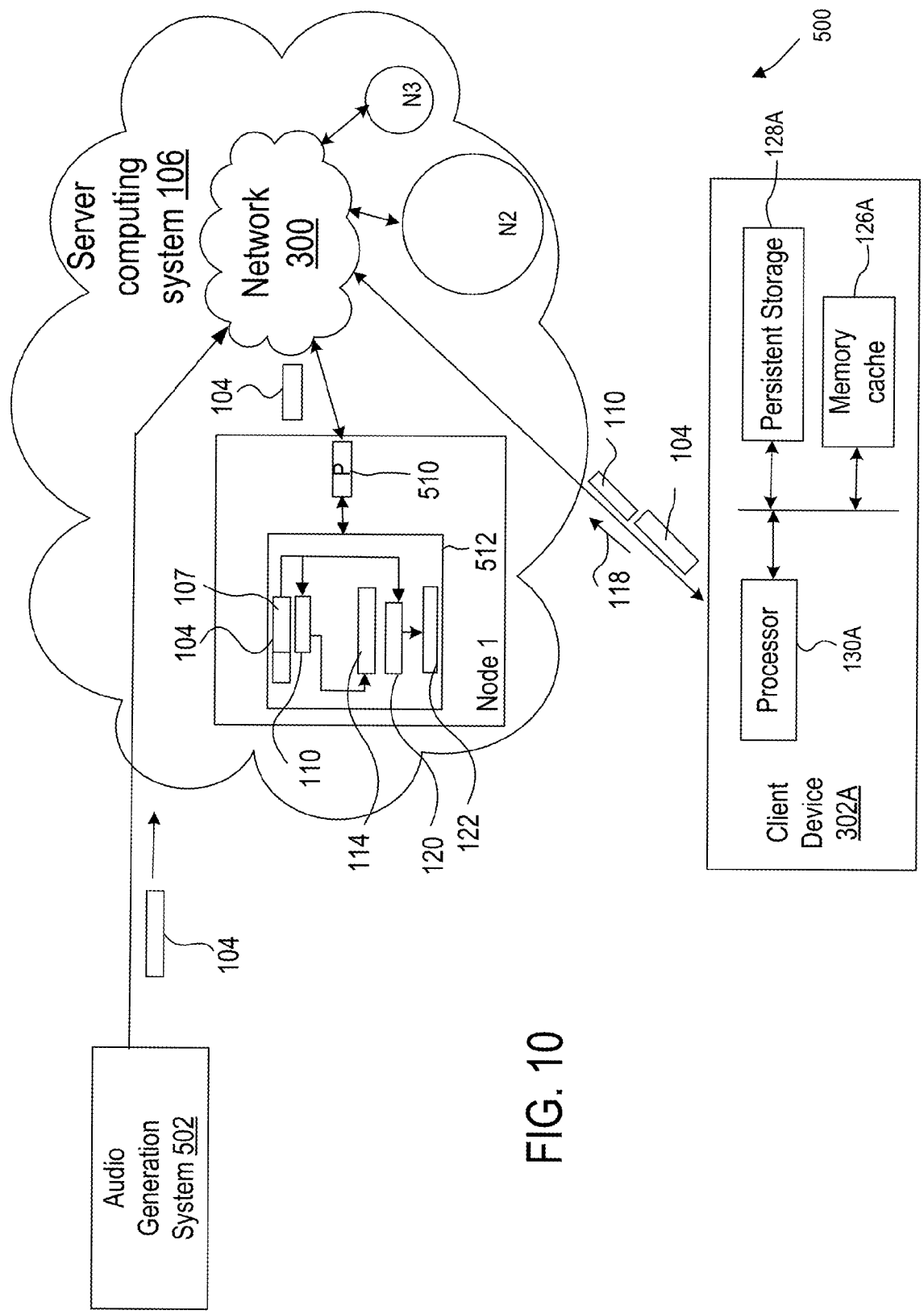
FIG. 10 is a block diagram of an embodiment of a system for transferring acoustic profile data via a network, in accordance with an embodiment described in the present disclosure.

FIG. 10 is a block diagram of an embodiment of a system 500 for transferring acoustic profile data via a network. A processor 510 of node 1 within the server computing system 106 receives login information, such as a user name and/or a password, from a client device of an audio generation system 502 and determines whether the login information is authentic. In one embodiment, the login information is information used to log into an email account. Upon determining that the login information is authentic, the processor 510 receives the audio file 104. The audio generation system 502 generates and sends the audio file 104 to the server computing system 106. Unless the login information is authenticated, the processor 510 cannot receive the audio file 104 from the client device of the audio generation system 502.

In some embodiments, the processor 510 receives the audio file 104 without receiving the login information first. In these embodiments, the processor 510 does not need to authenticate the login information.

In several embodiments, the audio generation system 502 includes one or more client devices, such as client devices 302A thru N. It should be noted that in various embodiments, the audio generation system 502 includes a number of processors and a number of memory devices. In one embodiment, the audio generation system 502 records air pressure variations in the form of a continuous signal. The continuous signal is sampled by the audio generation system 502 to generate audio data and a file header is attached to the audio data by the audio generation system 502 to generate the audio file 104.

In response to receiving the audio file 104, the processor 510 determines to upload and uploads the audio file 104 to a memory device 512. In some embodiments, instead of uploading the audio file 104 to the memory device 512, processor 510 uploads the audio file 104 to more than one memory devices.

Once the audio file 104 is uploaded to the memory device 512, the processor 510 extracts acoustic profile data 110 from audio data 107 of the audio file 104. In one embodiment, the audio data 107 embodies an entire song or an entire piece of music. Just as a song has an introduction, a middle portion, and a conclusion, an entire piece of music has an introduction, a middle portion, and a conclusion. The processor 510 attaches a file header to the acoustic profile data 110 to generate an acoustic profile 114.

Moreover, in some embodiments, the processor 510 generates metadata 120 from the audio data 107. The processor 510 then attaches a file header to the metadata 120 to generate a metadata file 122. In various embodiments, the metadata 120 and the metadata file 122 are not generated.

The processor 510 determines whether a request 118 for a song or music embodied in the audio data 107 is received from the client device 302A. In response to determining that the request 118 is not received, the processor 510 does not send the acoustic profile data 110 via the network 300 to the client device 302A. On the other hand, upon determining that the request 118 is received, the processor 510 sends the acoustic profile data 110 via the network 300 to the client device 302A. In one embodiment, the processor 510 sends the acoustic profile 114 via the network 300 to the client device 302A to send the acoustic profile data 110.

In various embodiments, the processor 510 sends the acoustic profile data 110 with the audio file 107 via the network 300 to the client device 302A. For example, the acoustic profile data 110 is sent synchronous with the audio file 107 via the network 300 to the client device 302A. As another example, the acoustic profile data 110 is sent instantaneously with or in real time with or simultaneously with the audio file 107 via the network 300 to the client device 302A. As yet another example, the acoustic profile data 110 is sent asynchronously with the audio file 107 via the network 300 to the client device 302A. As another example, the acoustic profile data 110 is sent within a time period before or after sending the audio file 107. As yet another example, the acoustic profile data 110 and the audio file 107 are sent in the same session. A session is a time period between an establishment of a connection between the node 1 and the client device 302A and a termination of the connection. In a session, a communication of data, such as acoustic profile data 110 or audio data 107, occurs when a request to establish a connection from the node 1 is accepted by the client device 302A.

In some embodiments, the processor 510 sends the metadata file 122 with the acoustic profile data 110 via the network 300 to the client device 302A instead of sending the audio file 107 with the acoustic profile data 110. The metadata file 122 is sent with the acoustic profile data 110 in any of the various ways described above with respect to sending the audio file 107 with the acoustic profile data 110. In these embodiments, the processor 510 sends the audio file 104 after sending the acoustic profile data 110 with the metadata file 122.

In various embodiments, the processor 510 sends the metadata file 122 with the acoustic profile data 110 and the audio file 107 via the network 300 to the client device 302A instead of sending the audio file 107 or the metadata file 122 with the acoustic profile data 110. The files 122 and 107 are sent with the acoustic profile data 110. For example, the acoustic profile data 110 is sent synchronous with the files 107 and 122 via the network 300 to the client device 302A. As another example, the acoustic profile data 110 is sent simultaneously with or instantaneously with or in real time with the files 107 and 122 via the network 300 to the client device 302A. As yet another example, the acoustic profile data 110 is sent asynchronously with the files 107 and 122 via the network 300 to the client device 302A. As another example, the acoustic profile data 110 is sent within a time period before or after sending the files 107 and 122. As yet another example, the acoustic profile data 110 and the files 107 and 122 are sent in the same session.

In one embodiment, in response to the request 118, the processor 510 sends a portion of the audio file 104 with the acoustic profile data 110 or acoustic profile 114 via the network 300 to the client device 302A. For example, the processor 510 sends a combination, such as an audio file 104*a*, of a portion of the audio data 107 and a portion of the file header of the audio file 104 with the acoustic profile data 110 or acoustic profile 114 via the network 300 to the client device 302A. As an example, the audio file 104*a* is sent with the acoustic profile data 110 or acoustic profile 114 in various ways, such as asynchronously with, synchronously with, simultaneously with, instantaneous with, or in real time with, described above with respect to sending the audio file 104 with the acoustic profile data 110 or the acoustic profile 114.

The portion of the file header of the audio file 104 is generated from the portion of the audio data. The processor 510 sends the remaining portions of the file header of the audio file 104 and the remaining portions of the audio data 107 as remaining audio files 104b thru 104n after sending the acoustic profile data 110 or acoustic profile 114. The audio file 104 is a combination of the audio files 104a thru 104n.

In some embodiments, in response to the request 118, the processor 510 sends a portion of the metadata file 122 with the acoustic profile data 110 or acoustic profile 114 via the network 300 to the client device 302A. For example, the processor 510 sends a combination, such as a metadata file 122a, of a portion of the metadata 120 and a portion of the file header of the metadata file 122 with the acoustic profile data 110 or acoustic profile 114 via the network 300 to the client device 302A. The metadata file 122a is sent with the acoustic profile data 110 or the acoustic profile 114 in any of the various ways described above with respect to sending the audio file 104 with the acoustic profile data 110 or the acoustic profile 114. The portion of the file header of the metadata file 122 is generated from the portion of the metadata 120. The processor 510 sends the remaining portions of the file header of the metadata file 122 and the remaining portions of the metadata 120 as the remaining metadata files 122b thru 122n after sending the acoustic profile data 110 or acoustic profile 114. The metadata file 122 is a combination of the metadata files 122a thru 122n.

In response to the request 118, a processor 130A of the client device 302A receives the acoustic profile data 110 with an audio file, such as the audio file 104 or 104a, and/or with a metadata file, such as the metadata file 122 or the metadata file 122a. The acoustic profile data 110 with the audio file 104 or the audio file 104a and/or the metadata file 122a or the metadata file 122 are stored in a persistent storage 128A and/or a memory cache 128A of the client device 302A. In some embodiments, the audio file 104 or 104a is stored in the persistent storage 128A and the metadata file 122 or 122a and the acoustic profile data 110 is stored in the memory cache 126A. In one embodiment, the audio file 104 or 104a, the metadata file 122 or 122a, or the acoustic profile data 110 is stored in the persistent storage 128A or the memory cache 126A. In various embodiments, a portion of the audio file 104 or 104a, the metadata file 122 or 12a, or the acoustic profile data 110 is stored in the persistent storage 128A and the remaining portion of the audio file 104 or 104a, the metadata file 122 or 122a, or the acoustic profile data 110 is stored in the memory cache 126A.

Is some embodiments, instead of the acoustic profile data 110, the acoustic profile 114 is received by the client device 302A with the audio file 104 or 104a and/or the metadata file 122 or 122a in response to the request 118. The acoustic profile 114 is received with the audio file 104 or 104a and/or the metadata file 122 or 122a in any of the various ways described above in which the acoustic profile data 110 is received with the audio file 104. For example, the acoustic profile 114 is received by the client device 302A instantaneously with, simultaneously with, in real time with, synchronous with, asynchronous with, or in the same session with the audio file 104 or 104a. As another example, the acoustic profile 114 is received by the client device 302A instantaneously with, simultaneously with, in real time with, synchronous with, asynchronous with, or in the same session with the metadata file 122 or 122a.

It is noted that in one embodiment, the functions performed by the processor 510 are distributed to be performed between various processors of nodes N1 and N2 or N3. Also, in some embodiments, the audio file 104 or 104a, the metadata file 122 or 122a, and/or the acoustic profile 114 are distributed between memory devices of various nodes N1 and N2 or N3. Also, it should be noted that although three nodes N1 thru N3 are shown, in some embodiments, any number of nodes are included within server computing system 106.

In some embodiments, instead of acoustic profile 114 being formed in the server computing system 106, the acoustic profile 114 is created from acoustic profile data 110 by the processor 130A. Similarly, in one embodiment, instead of the metadata file 122 or 122a being formed in the server computing system 106, the metadata file 122 or 122a is formed from metadata 120 by the processor 130A. In this embodiment, the metadata 120 or 120a is sent by the processor 510 instead of a metadata file with the acoustic profile data 110 via the network 300 to the client device 302A. The metadata 120a is metadata within the metadata file 122a.

Figure 11:
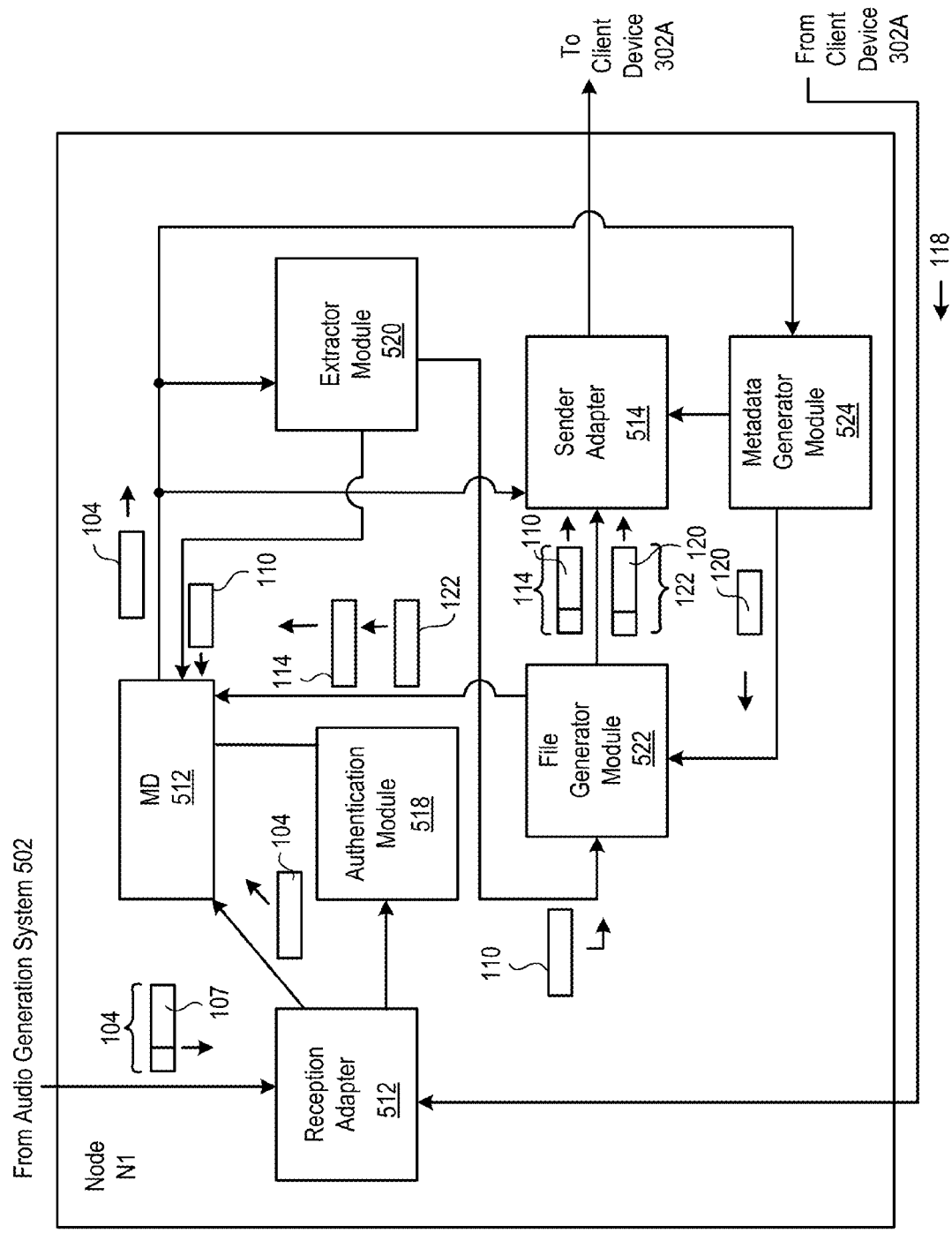
FIG. 11 is a block diagram of an embodiment of a node from which an audio file and acoustic profile data is accessed, in accordance with an embodiment described in the present disclosure.

FIG. 11 is a block diagram of an embodiment of the node N1. A reception adapter 512 receives the audio file 104 from the audio generation system 502. In one embodiment, an adapter includes one or more processors and one or more buffers. The reception adapter 512 and a sender adapter 514 are parts of a network interface adapter. An authentication module 518 authenticates the login information received from the audio generation system 502 and upon determining that the login information is authentic, the reception adapter 512 receives the audio file 104 from the audio generation system 502. In one embodiment, the authentication module 518 is a portion of an email application. In some embodiments, the audio file 104 cannot be received unless the login information is authenticated. In various embodiments, the reception adapter 512 receives the audio file 104 from the audio generation system 502 without a need to determine that the login information is authentic.

Upon reception of the audio file 104 from the audio generation system 502, the node 1 stores the audio file 104 in the memory device 512. An extractor module 520 accesses the audio file 104 from the memory device 512 to generate the acoustic profile data 110. In one embodiment, the extractor module 520 accesses the audio file 104 from the memory device 512 to generate the acoustic profile data 110. In several embodiments, the extractor module 520 accesses the audio file 104 from the memory device 512 to generate the acoustic profile data 110 as soon as the audio file 104 is stored in memory device 512. For example, the extractor module 520 does not wait for the reception of the request 118 to access the audio file 104 to generate the acoustic profile data 110. In one embodiment, the extractor module 520 accesses the audio file 104 to generate the acoustic profile data 110 upon receiving the request 118.

In one embodiment, the extractor module 520 stores the acoustic profile data 110 within the memory device 512. In another embodiment, instead of storing the acoustic profile data 110 within the memory device 512, the extractor module 520 sends the acoustic profile data 110 to a file generator module 522. The file generator module 522 generates the acoustic profile 114 from the acoustic profile data 110 and stores the acoustic profile 114 within the memory device 512.

In various embodiments, the file generator module 522 generates multiple audio files 104a, 104b up to 104n instead of the audio file 104. Each audio file 104a, 104b up to 104n includes a portion of a file header of the audio file 104 and a portion of the audio data 107. For example, the audio file 104a includes a first portion of a file header of the audio file 104 and a first portion 107a of the audio data 107. As another example, the audio file 104b includes a second portion of the file header of the audio file 104 and a second portion 107a of the audio data 107. The first and second portions of the file header of the audio file 104 are mutually exclusive and the first and second portions 107a and 107b of the audio data 107 are mutually exclusive. The portions 107a, 107b up to 107n of audio data can be combined to form the audio data 107.

In some embodiments, a metadata generator module 524 generates the metadata 120 from the audio file 104 and sends the metadata 120 to the file generator module 522. The file generator module 522 generates the metadata file 122 and stores the metadata file 122 in the memory device 512.

In various embodiments, the file generator module 522 generates multiple metadata files 122a, 122b up to 122n instead of the metadata file 122. Each metadata file 122a, 122b up to 122n includes a portion of a file header of the metadata file 122 and a portion of the metadata 120. For example, the metadata file 122a includes a first portion of a file header of the metadata file 122 and a first portion 120a of the metadata 120. As another example, the metadata file 122b includes a second portion of the file header of the metadata file 122 and a second portion 120b of the metadata 120. The first and second portions of the file header of the metadata file 122 are mutually exclusive and the first and second portions 120a and 120b are mutually exclusive. The portions 120a, 120b up to 120n of metadata can be combined to form the metadata 120.

When the request 118 for a song or music embodied in the audio data 107 is received by reception adapter 512 from the client device 302A, the sender adapter 514 accesses the audio file 104 or 104a and the acoustic profile data 110 or acoustic profile 114 from the memory device 512 and sends the audio file 104 or 104a with the acoustic profile data 110 or the acoustic profile 114 via the network 300 to the client device 302A.

Moreover, in some embodiments, when the request 118 is received by the reception adapter 512, the sender adapter 514 accesses the metadata file 122 or 122a and the acoustic profile data 110 or acoustic profile 114 from the memory device 512 and sends the metadata file 122 or 122a with the acoustic profile data 110 or the acoustic profile 114 via the network 300 to the client device 302A.

In one embodiment, a module is a computer software program that is executed by one or more processors. In some embodiments, a module is a programmable logic device, such as a field programmable gate array (FPGA), or an application specific integrated circuit (ASIC). In various embodiments, a module is a combination of computer software program and hardware, such as an ASIC or FPGA.

Figure 12:
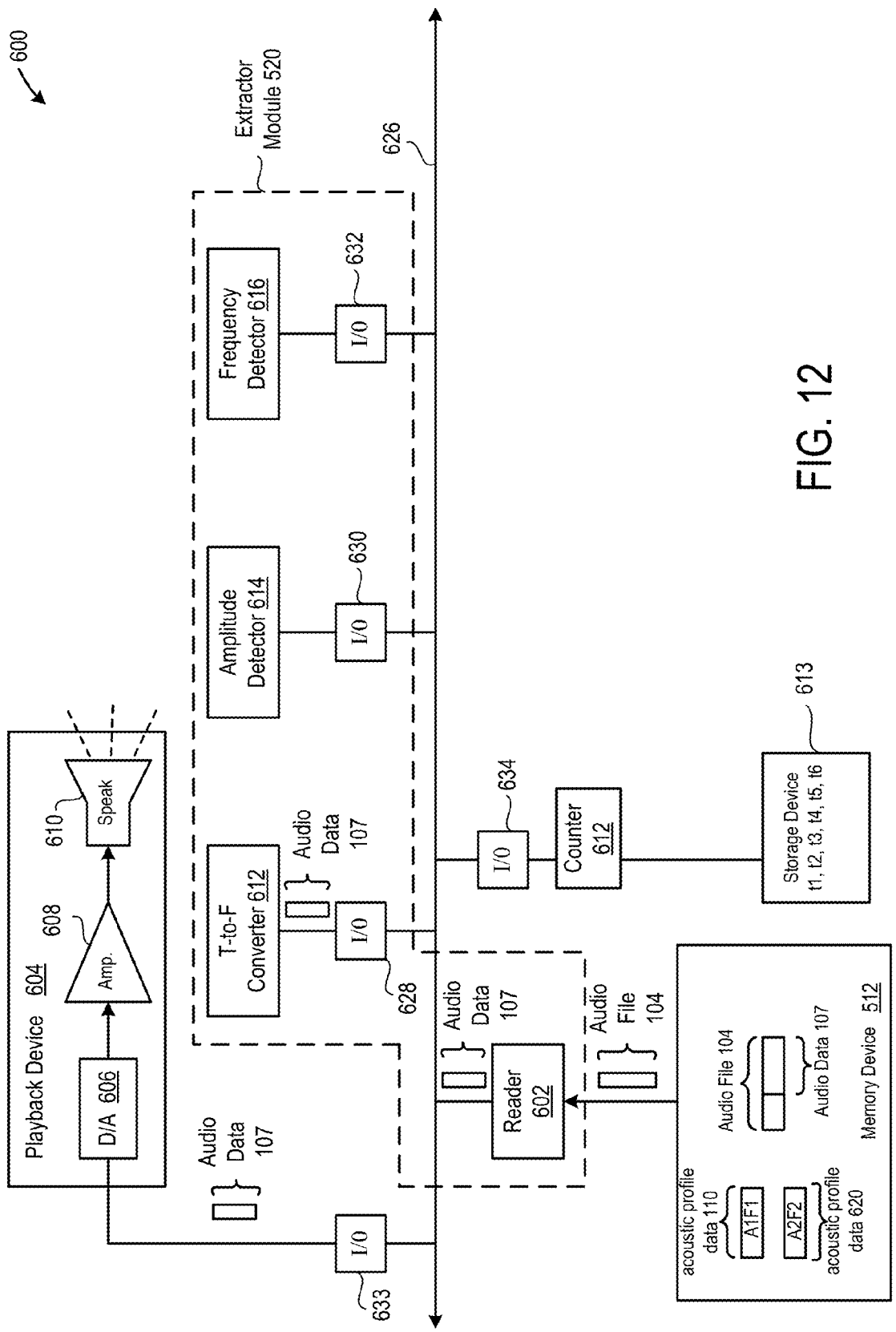
FIG. 12 is a block diagram of an embodiment of a system for extracting acoustic profile data from an audio file, in accordance with an embodiment described in the present disclosure.

FIG. 12 is a block diagram of an embodiment of a system 600 for extracting acoustic profile data 110 from the audio file 104. A reader 602 reads the audio file 104 from the memory device 512 to provide the audio data 107 to a playback device 604.

A digital-to-analog converter 606 of the playback device 604 converts the audio data 104 from a digital format into an analog format to generate an analog signal. An amplifier 106 amplifies the analog signal and sends the amplified analog signal to a speaker 610. The speaker 610 converts the amplified analog signal from an electrical form into air pressure waves. In some embodiments, the playback device 604 includes a decompressor that decompresses the audio data 107 if the audio data 107 is in a compressed form.

While the audio data 104 is played back via the playback device 604 to provide the air pressure waves, a counter 612 counts an amount of time passed since the start of the playback of the audio data 104.

Moreover, when the audio data 107 is played back, a time-to-frequency domain (T-to-F) converter 612 converts the audio data 107 from a time domain to a frequency domain. The audio data in the frequency domain is provided to an amplitude detector 614 to detect amplitudes A1, A2 until Az from the audio data, where z is an integer greater than 0. Moreover, the audio data in the frequency domain is provided to a frequency detector 616 to detect frequencies F1, F2, until Fz from the audio data. The amplitude A1 and the frequency F1 define the first feature and the amplitude A2 and the frequency F2 defines the second feature. The combination of the amplitude A1 and the frequency F1 is the acoustic profile data 110 and the combination of the amplitude A2 and the frequency F2 is acoustic profile data 620.

It is noted that components, such as T-to-F converter 612, amplitude detector 614, frequency detector 616, reader 602, playback device 604, and counter 612 communicate with each other via a bus 626. Moreover, the T-to-F converter 612 communicates with bus 626 via an input/output port (I/O) 628, the amplitude detector 614 communicates with bus 626 via an I/O 630, the frequency detector 616 communicates with bus 626 via an I/O 632, the counter 612 communicates with bus 626 via an I/O 634, and the playback device 604 couples with bus 626 via an I/O 633.

Figure 13:
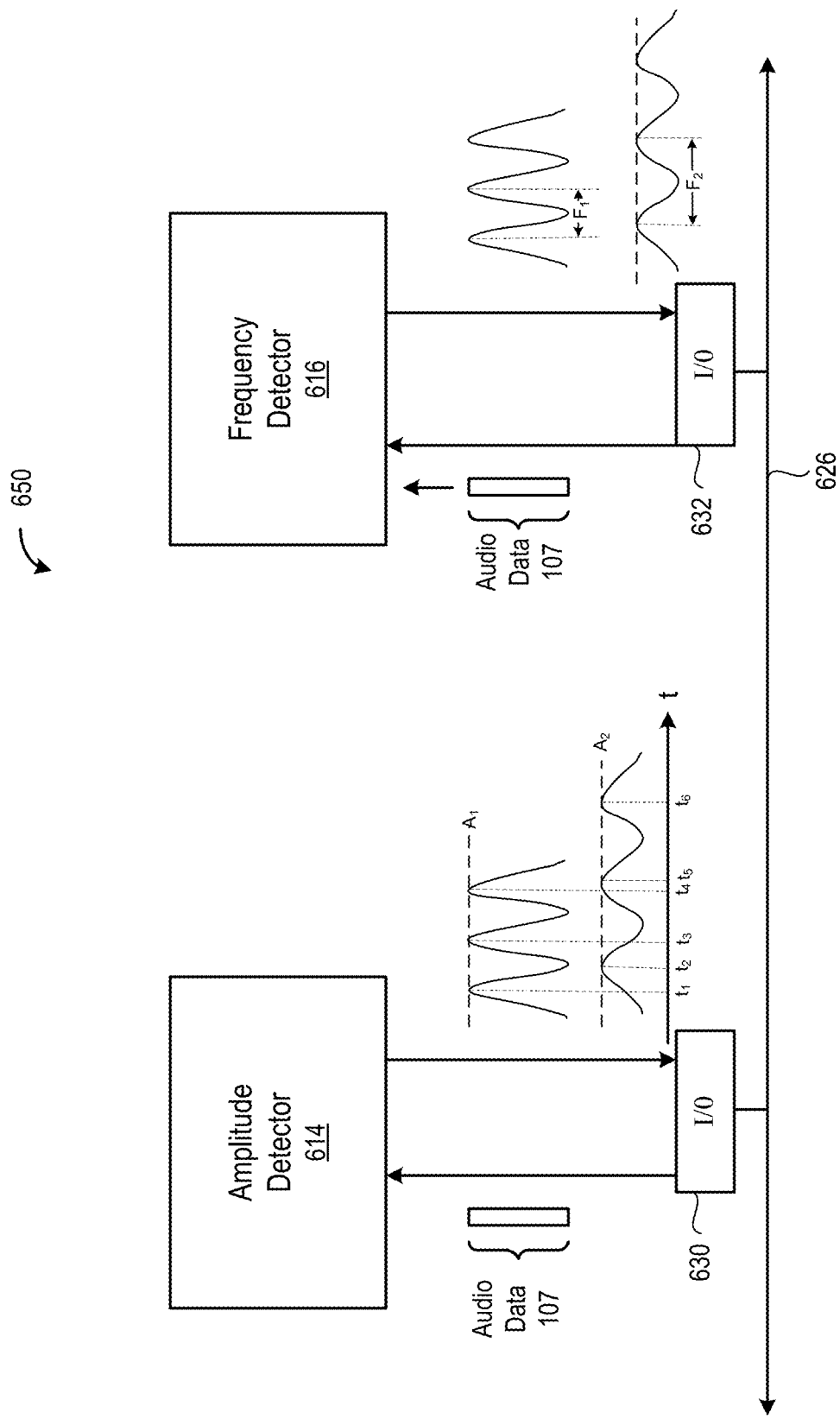
FIG. 13 is a block diagram of an embodiment of a portion of the system of FIG. 12, in accordance with an embodiment described in the present disclosure.

FIG. 13 is a block diagram of an embodiment of a portion 650 of the system 600 of FIG. 12. The counter 612 (FIG. 12) counts up to time t1, at which the amplitude A1 is generated. The counter 612 further counts from time t1 to t2, at which the amplitude A2 is generated. The counter further counts from time t2 to t3, at which the amplitude A1 is generated. The counter counts from time t3 to t4, at which the amplitude A1 is generated. The counter further counts from time t4 to t5, at which the amplitude A2 is generated. The counter counts from time t5 to t6, at which the amplitude A2 is generated. The times t1 thru t6 are stored by the counter 612 into a storage device 613. In some embodiments, the times t1 thru t6 are accessed by the file generator module 522 (FIG. 11) and integrated as part of the file header of the acoustic profile 114. In one embodiment, the times t1 thru t6 are accessed by the extractor module 520 (FIG. 12) and integrated as part of the acoustic profile data 110.

Examples of the amplitudes A1 and A2 and the frequencies F1 and F2 are shown in FIG. 13. As shown, the amplitude A1 is different than the amplitude A2 and the frequency F2 is different than the frequency F2. For example, the amplitude A1 is greater than the amplitude A2 and the frequency F1 is greater than the frequency F2. In some embodiments, peak-to-peak amplitudes or root mean square amplitudes are used instead of the peak amplitudes A1 and A2.

In one embodiment, a combination of more than one frequency and/or more than one amplitude defines the first feature and/or the second feature. For example, the first acoustic profile data includes a combination of multiple amplitudes and a combination of multiple frequencies. As another example, the second acoustic profile data includes a combination of multiple amplitudes and a combination of multiple frequencies. As yet another example, a frequency defines the first feature and another frequency defines the second feature. As yet another example, an amplitude defines the first feature and another amplitude defines the second feature.

In response to receiving the audio data 107, the amplitude detector 614 provides the amplitudes A1 and A2 as outputs.

Moreover, in response to receiving the audio data 107, the frequency detector 616 provides the frequencies F1 and F2 as outputs.

Figure 14A:
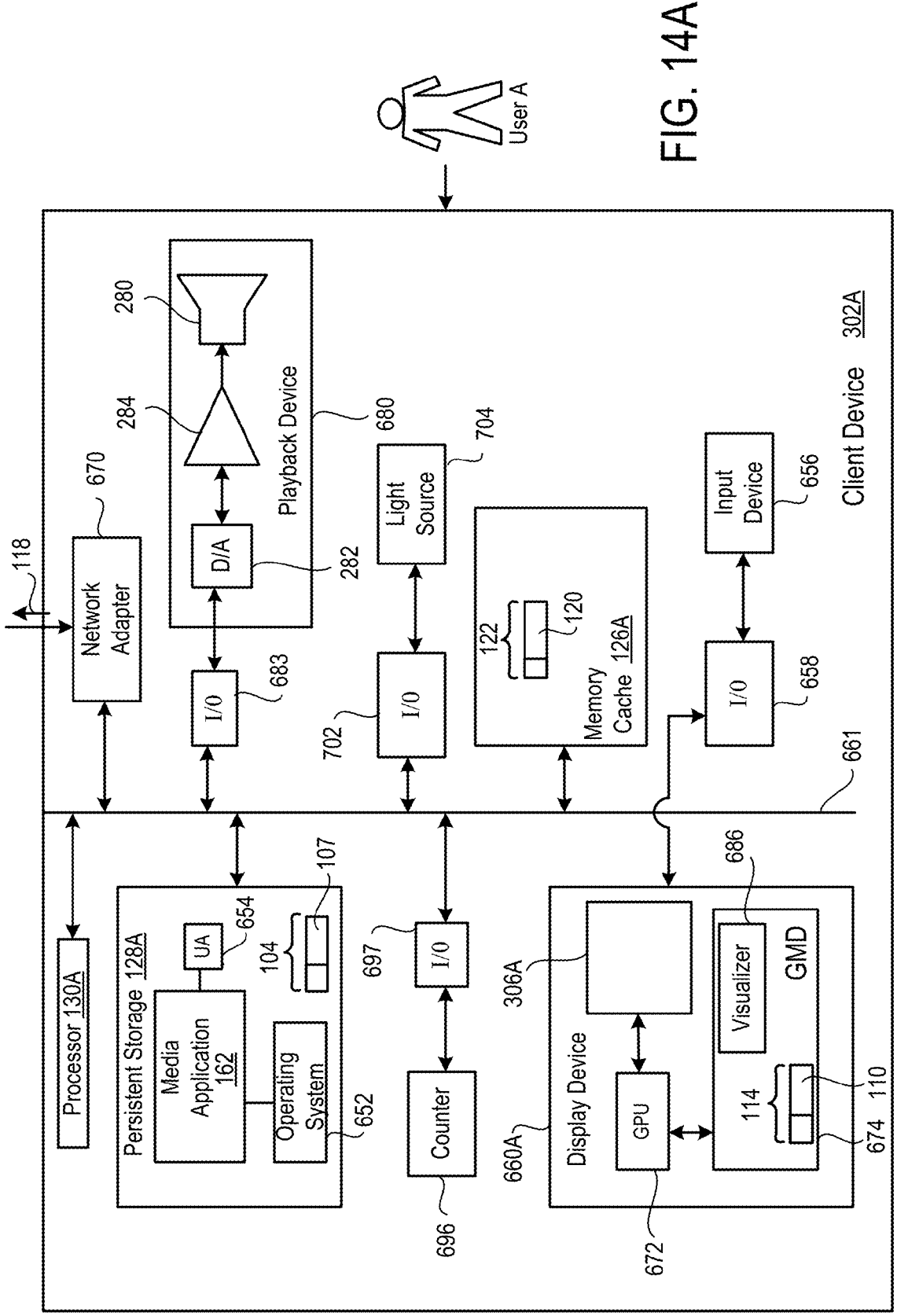
FIG. 14A is a block diagram of an embodiment of a client device for rendering visualizations related to audio data, in accordance with an embodiment described in the present disclosure.

FIG. 14A is a block diagram of an embodiment of client device 302A for rendering visualizations related to audio data. The user A uses client device 302A to access the network 300 via a media application 162 that is stored in persistent storage 126A. For example, the user A selects the media application 162 via an input device 656, which is coupled with a bus 661 via an I/O 658. Examples of an input device include a keyboard, a mouse, and a stylus. In some embodiments, an input device is a touch screen integrated with display screen 306A. The media application 162 is executed by processor 130A on top of an operating system (OS) 652. The OS 652 is executed by processor 130A.

A user application (UA) 654 is executed on top of the media application 654. Examples of the user application 654 include a music storage and playback application. In some embodiments, the user application 654 is executed on top of another user application, such as an email application, which is executed on top of OS 652. In various embodiments, user application 654 is not executed on top of another user application but is executed on top of OS 652 and media application 652.

The user A views a list of songs or a list describing music on the display screen 306A of a display device 660A. Examples of a list of songs include a list of titles of songs, a list of songs by artist, a list of songs by album and a list of songs by genre. Examples of a list describing music include a list of titles of music, a list describing music by artist, a list describing music by album and a list describing music by genre. A list of songs and/or a list describing music are generated in response to execution of the user application 654.

A list of songs and/or a list describing music are rendered by a graphical processing unit (GPU) 672 on display screen 306A. When processor 130A determines a selection of a song from a list of songs or music from a list describing music is received from input device 656, the processor 130A sends the request 118 for audio data embodying a song or music selected by user A via input device 656 to the server computing system 106 (FIG. 10). The processor 130A sends the request 118 via a network adapter 670 to the server computing system 106. Examples of the network adapter 670 include a wire-based network adapter and a wireless network adapter.

In response to sending the request 118, the audio file 104 and the acoustic profile data 110 are received by the network adapter 670 from the server computing system 106. In some embodiments, in response to sending the request 118, the acoustic profile 114 and the audio file 104 are received from the server computing system 106. Moreover, in one embodiment, in response to sending the request 118, the audio file 104 is received with the acoustic profile 114 or the acoustic profile data 110. In various embodiments, in response to sending the request 118, the metadata file 122 is received with the acoustic profile 114 or the acoustic profile data 110 and then the audio file 104 is received.

In one embodiment, the acoustic profile 114 and one or more of the audio files 104a, 104b up to 104n are received by the network adapter 670 from the server computing system 106. For example, the acoustic profile 114 is received with the audio file 104a. In some embodiments, the acoustic profile data 110 and one or more of the audio files 104a, 104b up to 104n are received by the network adapter 670 from the server computing system 106. For example, the acoustic profile data 110 is received with the audio file 104a. In some embodiments, the acoustic profile data 110 or acoustic profile 114 and one or more of the metadata files 122a, 122b up to 122n are received by the network adapter 670 from the server computing system 106. For example, the acoustic profile data 110 and the metadata file 122a are received.

The processor 130A receives the audio file 104 from the network adapter 670 and stores the audio file 104 within the persistent storage 128A. In some embodiments, the processor 130A receives the one or more of the audio files 104a, 104b up to 104n from the network adapter 670 and stores the one or more of the audio files 104a, 104b up to 104n in the persistent storage 128A. In various embodiments, the processor 130A receives the one or more of the metadata files 122a, 122b up to 122n from the network adapter 670 and stores the one or more of the metadata files 122a, 122b up to 122n in the memory cache 126A.

Moreover, the graphical processing unit 672 receives the acoustic profile data 110 or the acoustic profile 114 from the network adapter 670 and stores the acoustic profile data 110 or the acoustic profile 114 within a graphical memory device 674, such as a RAM or a combination of RAM and ROM.

In some embodiments, any processor of the client device 302A avoids extracting the acoustic profile data 110 from the audio file 104 in response to receiving the audio file 104. For example, the client device 302A avoids extracting acoustic profile data 110 from the audio data 107 or 107a in real time as a music or song that is embodied in the audio data 107 or 107a is being played.

Upon storing an audio file, such as the audio file 104 or the audio file 104a, in persistent storage 128A, the processor 130A removes the file header from the audio file and sends audio data, such as audio data 107 or 107a, within the audio file to a playback device 680 for playing the audio data. The playback device 680 is coupled with bus 661 via an I/O 683. A digital-to-analog converter 282 of the playback device 680 converts the audio data, such as audio data 107 or 107a, from a digital format into an analog format and then the audio data in the analog format is provided to an amplifier 284 to amplify the audio data. The amplified audio data is provided by the amplifier 284 to the speaker 280 to play the song or music embodied in the audio data 107 or a portion of the song or music that is embodied in the audio data 107a. For example, the speaker 280 converts electrical signals, such as the audio data 107 or 107a, that is amplified and in the analog format into sound waves, such as air pressure waves. The user A listens to the sound that is output from the speaker 280.

In some embodiments, the playback device 680 includes a decompressor that decompresses the audio data 107 or 107a when the audio data 107 or 107a is in a compressed form. The decompressor is coupled with the digital-to-analog converter 293.

In one embodiment, if the acoustic profile 114 is received in a compressed form from the server computing system 106, the graphical processing unit 672 decompresses the acoustic profile 114 before rendering visualizations of features embodied in the acoustic profile data 110.

Figure 14B:
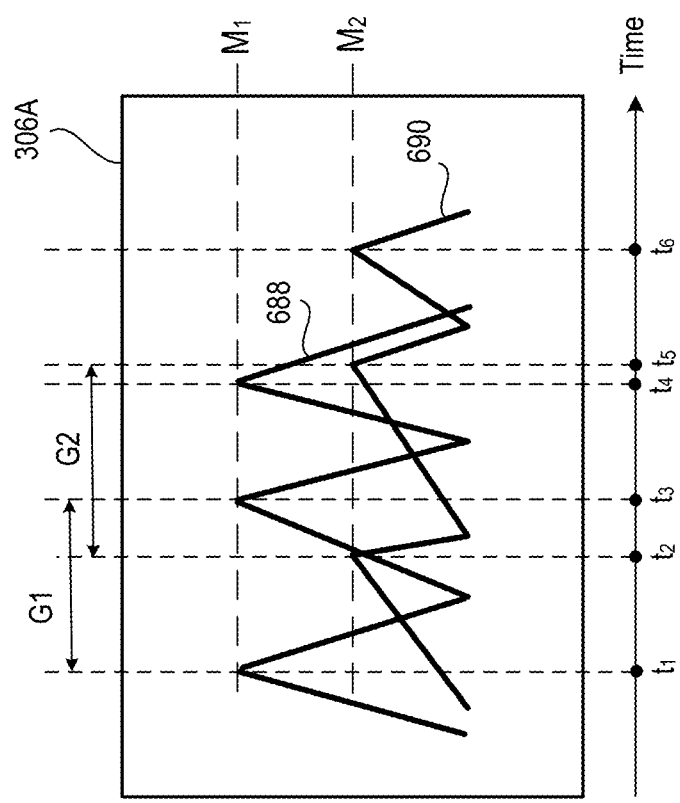
FIG. 14B is a diagram of an embodiment of a display screen of a client device to illustrate a display of various waveforms that represent various features, in accordance with an embodiment described in the present disclosure.

FIG. 14B is a diagram of an embodiment of the display screen 306A. While a song or music embodied in the audio data 104 or a portion of the song or music embodied in the audio data 104a is being played, the graphical processing unit 672 extracts the acoustic profile data 110 from the acoustic profile 114 and executes a visualizer 686 that is stored within graphical memory device 674 (FIG. 14A) to render, such as display, visualizations, such as waveforms 688 and 690, of the acoustic profile data 110. For example, graphical processing unit 672 (FIG. 14A) processes the amplitudes A1 and F1 to render an amplitude M1 at a frequency G1. As another example, graphical processing unit 672 processes the amplitudes A2 and F2 to render an amplitude M2 at a frequency F2.

The amplitude M1 is a visualization, such as a representation, of the amplitude A1 and the frequency G1 is a visualization of the frequency F1. Similarly, the amplitude M2 is a visualization of the amplitude A2 and the frequency G2 is a visualization of the frequency F2. The amplitude M1 and the frequency G1 represent the first feature and the amplitude M2 and the frequency G2 represent the second feature. The user A sees the visualizations on display screen 306A while listening to the sound emitted by speaker 280.

From the start of the playback of audio data, such as audio data 107 or audio data 107a, a counter 696 (FIG. 14A) counts an amount of time taken to playback the audio data. The counter 696 is coupled with bus 661 via an I/O 697. Graphical processing unit 672 determines from the count whether the times t1, t2, t3, t4, t5, and t6 are reached. At time t1, the graphical processing unit 672 renders the amplitude M1, at time t2, the graphical processing unit 672 renders the amplitude M2, at times t3 and t4, the graphical processing unit 672 renders the amplitude M1. Moreover, at times t5 and t6, the graphical processing unit 672 renders the amplitude M2.

In some embodiments, one or more amplitudes and/or one or more frequencies represent the first feature and one or more amplitudes and/or one or more frequencies represent the second feature.

Referring back to FIG. 14A, in various embodiments, instead of or in addition to the rendering on the display screen 306A, the processor 130A sends signals to an I/O 702, which drives a light source 704 during the playback of audio data, such as audio data 107 or audio data 107a. For example, at the times t1 thru t6, the processor 130A sends signals to the I/O 702 to turn on or off the light source 704 at that time. Examples of the light source 704 includes one or more LED lights, one or more organic LED lights, one or more polymer LED lights, one or more electrical filaments, and one or more plasma-based lights. In one embodiment, the light source 704 surrounds the display screen 306A.

In some embodiments, the graphical processing unit 672 determines whether the acoustic profile data 110 is in the frequency domain or the time domain. In response to determining that the acoustic profile data 110 is in the frequency domain, the graphical processing unit 672 converts the acoustic profile data 110 from the frequency domain to the time domain and sends the acoustic profile data 110 to the playback device 680. On the other hand, upon determining that the acoustic profile data 110 is in the time domain, the graphical processing unit 672 avoids converting the acoustic profile data 110 into the time domain. For example, in case the node N1 has converted the acoustic profile data 110 from the frequency domain into the time domain, the graphical processing unit 672 avoids the conversion from the frequency domain into the time domain.

It should be noted that in several embodiments, the functions performed by the processor 130A and the graphical processing unit 672 are performed by a single processor or any other number of processors. Moreover, instead of the audio file 104 or 104a being stored in persistent storage 128A, in one embodiment, the audio file 104 or 104a is stored in memory cache 126A. Also, instead of the acoustic profile 114 being stored in graphical memory device 674, in some embodiments, the acoustic profile 114 or acoustic profile data 110 is stored in persistent storage 128A.

In some embodiments, the audio data 107 or 107a is played back simultaneously, instantaneously with, synchronous with, or in real time with the rendering of one or more visualizations. In another embodiment, the audio data 107 or 107a is played back simultaneously, instantaneously with, synchronous, with, or in real time with the turning on or off of the light source 704.

FIG. 15 is a diagram of an embodiment of the display screen 306A. A singer 702 is displayed singing a song that is embodied in the audio data 107. For example, the graphical processing unit 672 (FIG. 14A) processes a video file that is stored in graphical memory device 674 to display the singer 702 while the audio data, such as audio data 107 or 107a, is played.

While the singer 702 is displayed on display screen 306A as singing a song, the graphical processing unit 672 also renders visualizations 206A, 206B, 206C, and 206D of the first feature in respective pixels 208A, 208B, 208C, and 208D of the display screen 306A. Moreover, while the singer 702 is displayed on display screen 306A as singing a song, the graphical processing unit 672 also renders visualizations 210A, 210B, 210C, and 210D of the second feature in respective pixels 212A, 212B, 212C, and 212D of the display screen 306A.

In several embodiments, instead of the video file, the graphical processing unit 672 processes an animation file to display an animation that sings a song embodied in the audio data 107 while the audio data 107 is played by the playback device 680. The animation file is stored in the graphical memory device 674. In one embodiment, instead of the video file, the graphical processing unit 672 processes an animation file to display an animation that sings a portion of a song embodied in the audio data 107a while the audio data 107a is played by the playback device 680.

In some embodiments, instead of the singer that sings or an animation that sings, a file, such as a video file or an animation file, is processed by the graphical processing unit 672 to display an artist that plays music that is embodied in the audio data 107 and played back via the playback device 680. In one embodiment, instead of the singer that sings or an animation that sings, a file, such as a video file or an animation file, is processed by the graphical processing unit 672 to display an artist that plays a portion of music that is embodied in the audio data 107a and played back via the playback device 680.

It should be noted that although visualizations 206 and 210 are shown as having a shape, in some embodiments, the visualizations 206 or 210 has any other shape than that shown in FIG. 15. For example, the visualization 206A has a shape of an oval, circle, polygon, rectangle, or a waveform. As another example, the visualization 210A has the shape of an oval, circle, polygon, rectangle, or a waveform.

Moreover, although visualization 206A or 210A is shown to occupy a pixel, in some embodiments a visualization is displayed within any number of pixels of display screen 306A. For example, a representation of the first feature is displayed on a first surface area that includes one or more pixels of the display screen 306A and a representation of the second feature is displayed on a second surface area that includes one or more pixels of the display screen 306A.

Embodiments described in the present disclosure can be fabricated as computer readable code on a non-transitory computer readable storage medium, which is a storage device or a memory device. The non-transitory computer readable storage medium holds data which can be read by a computer system. Examples of the non-transitory computer readable storage medium include network attached storage (NAS), ROM, RAM, a combination of RAM and ROM, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Although the method operations were described in a specific order, it should be understood that some operations may be performed in a different order, when the order of the operations do not affect the expected results. For example, in the method 240 of FIG. 3, the metadata is generated in operation 138 before determining whether a request is received in operation 134. In addition, other operations may be included in the methods presented, and the operations may be performed by different entities in a distributed fashion, as long as the processing of the operations is performed in a desired way.

In addition, at least one operation of some methods performs physical manipulation of physical quantities, and some of the operations described herein are useful machine operations. Embodiments presented herein recite a device or apparatus. The apparatus is specially constructed for the required purpose. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method for facilitating rendering a visualization related to audio data, comprising:
   receiving login information;
   determining that the login information is authentic;
   accessing an audio file that is stored within a server computing system, the audio file including the audio data;
   extracting, by the server computing system, acoustic profile data from the audio data by converting the audio data from a time domain to a frequency domain, detecting a set of frequencies from the frequency domain, and detecting, for each frequency in the set of frequencies, a corresponding amplitude, the acoustic profile data comprises at least one of a plurality of amplitudes or a plurality of frequencies of the audio data;
   associating the acoustic profile data with the audio file;
   generating an acoustic profile based on the acoustic profile data;
   subsequent to associating the acoustic profile data with the audio file, receiving a request for playback of the audio file from a mobile device; and
   responsive to the request, concurrently streaming the audio file and the acoustic profile from the server computing system to the mobile device, wherein the visualization rendered on the mobile device is based on the acoustic profile data.

2. The method of claim 1, wherein extracting the acoustic profile data is performed after the audio file is uploaded to the server computing system.

3. The method of claim 1, wherein sending the acoustic profile data comprises sending the acoustic profile data and the audio data to the mobile device.

4. The method of claim 1, wherein extracting the acoustic profile data comprises extracting at least one of an expression of a pitch, an expression of a tone, a representation of a treble, an expression of a bass, an expression of a lyric, an expression of beats per minute, an expression of a note, an expression of a type of instrument, and an expression of an identity of an artist from the audio data.

5. The method of claim 1, wherein extracting the acoustic profile data comprises extracting an expression of a pitch, an expression of a tone, a representation of a treble, an expression of a bass, an expression of a lyric, an expression of beats per minute, an expression of a note, an expression of a type of instrument, and an expression of an identity of an artist from the audio data.

6. The method of claim 1, further compromising:
   generating metadata associated with the audio file based on the audio data in response to receiving the request; and
   sending the metadata with the acoustic profile to the mobile device, wherein the sending the acoustic profile data to the mobile device comprises sending the acoustic profile to the mobile device.

7. The method of claim 1, wherein the login information is received from an audio generation system.

8. The method of claim 1, wherein extracting the acoustic profile data comprises:
   determining the at least one of the plurality of amplitudes or the plurality of frequencies from the audio data; and
   generating the acoustic profile data including the at least one of the plurality of amplitudes or the plurality of frequencies.

9. A method for rendering visualizations related to audio data, comprising:
   executing, by a mobile device, a media application;
   receiving a first request at the media application to play the audio data embodied in an audio file;
   sending a second request via the media application for the audio file to a server computing system in response to receiving the first request, the audio file having been uploaded to the server computing system from an audio generation system after authenticating login information received from the audio generation system;
   receiving concurrently, streaming from the server computing system, the audio file and an acoustic profile in response to the second request, wherein the acoustic profile is based on acoustic profile data determined by converting the audio data from a time domain to a frequency domain, detecting a set of frequencies from the frequency domain, and detecting, for each frequency in the set of frequencies, a corresponding amplitude; and
   displaying, on a display of the mobile device, a visualization based on the acoustic profile with playback of the audio file.

10. The method of claim 9, wherein receiving the first request comprises receiving a selection of an identification of the audio file from a user.

11. The method of claim 9, wherein sending the second request comprises sending the second request for the audio file via a network.

12. The method of claim 9, further comprising avoiding, by the mobile device, extracting the acoustic profile data from the audio file in response to receiving the audio file.

13. The method of claim 9, wherein the displaying comprises:
   rendering a representation of a first of the at least one of the plurality of amplitudes or the plurality of frequencies on a first area of a display screen; and
   rendering a representation of a second of the at least one of the plurality of amplitudes or the plurality of frequencies on a second area of the display screen.

14. A server computing system for facilitating rendering a visualization related to audio data, comprising:
   a memory device configured to store an audio file that includes the audio data;
   a processor configured to:

receive login information;
determine that the login information is authentic;
access the audio file from the memory device;
extract acoustic profile data from the audio data by converting the audio data from a time domain to a frequency domain, detecting a set of frequencies from the frequency domain, and detecting, for each frequency in the set of frequencies, a corresponding amplitude, the acoustic profile data comprises at least one of a plurality of amplitudes or a plurality of frequencies of the audio data;
associate the acoustic profile data with the audio data; and
generate an acoustic profile based on the acoustic profile data; and
subsequent to associating the acoustic profile data with the audio file, receive a request for playback of the audio file from a mobile device; and
an adapter configured to concurrently stream, responsive to the request, the audio file and the acoustic profile to the mobile device, wherein the visualization rendered on the mobile device is based on the acoustic profile data.

15. The server computing system of claim 14, wherein the acoustic profile data comprises at least one of an expression of a pitch, an expression of a tone, an expression of a treble, an expression of a bass, an expression of a lyric, an expression of a beats per minute, an expression of a note, an expression of a type of instrument, or an expression of an identity of an artist.

16. A client device for rendering visualizations related to audio data, comprising:
a processor configured to:
execute a media application;
receive a first request at the media application to play the audio data embodied in an audio file;
send a second request via the media application for the audio file to a server computing system in response to receiving the first request, the audio file having been uploaded to the server computing device from an audio generation system after authenticating login information received from the audio generation system;
receive concurrently, streaming from the server computing system, an acoustic profile and the audio file in response to the second request, wherein the acoustic profile is based on acoustic profile data determined by converting the audio data from a time domain to a frequency domain, detecting a set of frequencies from the frequency domain, and detecting, for each frequency of the set of frequencies, a corresponding amplitude; and
visually render a visualization based on the acoustic profile with playback of the audio file; and
a memory configured to store the audio file.

17. The client device of claim 16, wherein the acoustic profile expresses a plurality of features, the plurality of features including a pitch, a tone, a treble, a bass, a lyric, a beats per minute, a note, a type of instrument, and an identity of an artist.

18. The client device of claim 16, wherein the processor is configured to:
render a representation of a first of the at least one of the plurality of amplitudes or the plurality of frequencies on a first area of a display device; and
render a representation of a second of the at least one of the plurality of amplitudes or the plurality of frequencies on a second area of the display device.

* * * * *